(12) United States Patent
Hoenle et al.

(10) Patent No.: US 11,789,233 B2
(45) Date of Patent: Oct. 17, 2023

(54) OBJECTIVE, USE OF AN OBJECTIVE, MEASUREMENT SYSTEM COMPRISING AN OBJECTIVE AND USE OF A BI-ASPHERICAL PLASTIC LENS IN AN OBJECTIVE

(71) Applicant: JENOPTIK Optical Systems GmbH, Jena (DE)

(72) Inventors: Tobias Hoenle, Munich (DE); Sebastian Wendel, Rosenbach i. Vogtl. (DE)

(73) Assignee: Jenoptik Optical Systems GmbH, Jena (DE)

( * ) Notice: Subject to any disclaimer, the term of this patent is extended or adjusted under 35 U.S.C. 154(b) by 0 days.

(21) Appl. No.: 17/926,439

(22) PCT Filed: May 11, 2021

(86) PCT No.: PCT/EP2021/062490
§ 371 (c)(1),
(2) Date: Nov. 18, 2022

(87) PCT Pub. No.: WO2021/233737
PCT Pub. Date: Nov. 25, 2021

(65) Prior Publication Data
US 2023/0185057 A1     Jun. 15, 2023

(30) Foreign Application Priority Data

May 19, 2020 (DE) .................. 10 2020 113 529.7
Jun. 10, 2020 (DE) .................. 10 2020 115 494.1

(51) Int. Cl.
*G01C 3/08* (2006.01)
*G02B 9/60* (2006.01)
*G01S 7/481* (2006.01)
*G01S 7/4915* (2020.01)
*G02B 13/00* (2006.01)
*G02B 13/16* (2006.01)
(Continued)

(52) U.S. Cl.
CPC .............. *G02B 9/60* (2013.01); *G01S 7/4814* (2013.01); *G01S 7/4816* (2013.01); *G01S 7/4915* (2013.01); *G02B 13/0045* (2013.01); *G02B 13/16* (2013.01); *G02B 9/34* (2013.01); *G02B 13/004* (2013.01); *G02B 13/0005* (2013.01); *G02B 13/22* (2013.01)

(58) Field of Classification Search
None
See application file for complete search history.

(56) References Cited

U.S. PATENT DOCUMENTS 6,707,621 B2    3/2004    Abe
7,940,478 B2    5/2011    Take
(Continued)

FOREIGN PATENT DOCUMENTS

CN     103941395 A     7/2014
CN     205829628 U     12/2016
(Continued)

*Primary Examiner* — Mark Hellner
(74) *Attorney, Agent, or Firm* — Muncy, Geissler, Olds & Lowe, P.C.

(57) ABSTRACT

A hybrid fixed focal length lens that includes five lens elements and a diaphragm for a LIDAR measurement system. Some of the lens elements have surfaces that are aspherical.

13 Claims, 12 Drawing Sheets

(51) Int. Cl.
   *G02B 9/34*     (2006.01)
   *G02B 13/22*    (2006.01)

(56) References Cited

U.S. PATENT DOCUMENTS

| | | |
|---|---|---|
| 8,654,457 B2 | 2/2014 | Jin et al. |
| 9,519,123 B2 | 12/2016 | Asami |
| 9,915,803 B2 | 3/2018 | Suzuki |
| 10,313,356 B2 | 6/2019 | Raynor |
| 10,386,488 B2 | 8/2019 | Ridderbusch |
| 10,488,633 B2 | 11/2019 | Matsumoto |
| 11,181,725 B1 * | 11/2021 | Ning ................. G02B 13/04 |
| 2016/0004036 A1 | 1/2016 | Asami |
| 2017/0068071 A1 | 3/2017 | Tang et al. |
| 2017/0090032 A1 | 3/2017 | Ridderbusch |
| 2019/0310442 A1 * | 10/2019 | Ikeo .................. H04N 23/55 |

FOREIGN PATENT DOCUMENTS

| | | | |
|---|---|---|---|
| CN | 108227153 B * | 8/2019 | ............. G02B 13/18 |
| DE | 10 2015 115 460 A1 | 3/2016 | |
| DE | 11 2013 006 823 B4 | 1/2018 | |
| EP | 2 657 742 A1 | 10/2013 | |
| EP | 2 725 404 A1 | 4/2014 | |
| EP | 2 725 405 A1 | 4/2014 | |
| EP | 3 220 179 A1 | 9/2017 | |
| JP | H 04-55807 A | 2/1992 | |
| JP | 2015-18086 A | 1/2015 | |
| TW | M593560 U | 4/2020 | |
| WO | WO 2012/086194 A1 | 6/2012 | |
| WO | WO 2015/126471 A2 | 8/2015 | |
| WO | WO 2015/189024 A1 | 12/2015 | |
| WO | WO 2015/189025 A1 | 12/2015 | |
| WO | WO 2016/110883 A1 | 7/2016 | |
| WO | WO 2016/204844 A1 | 12/2016 | |
| WO | WO 2017/164989 A1 | 9/2017 | |
| WO | WO 2017/180277 A1 | 10/2017 | |

* cited by examiner

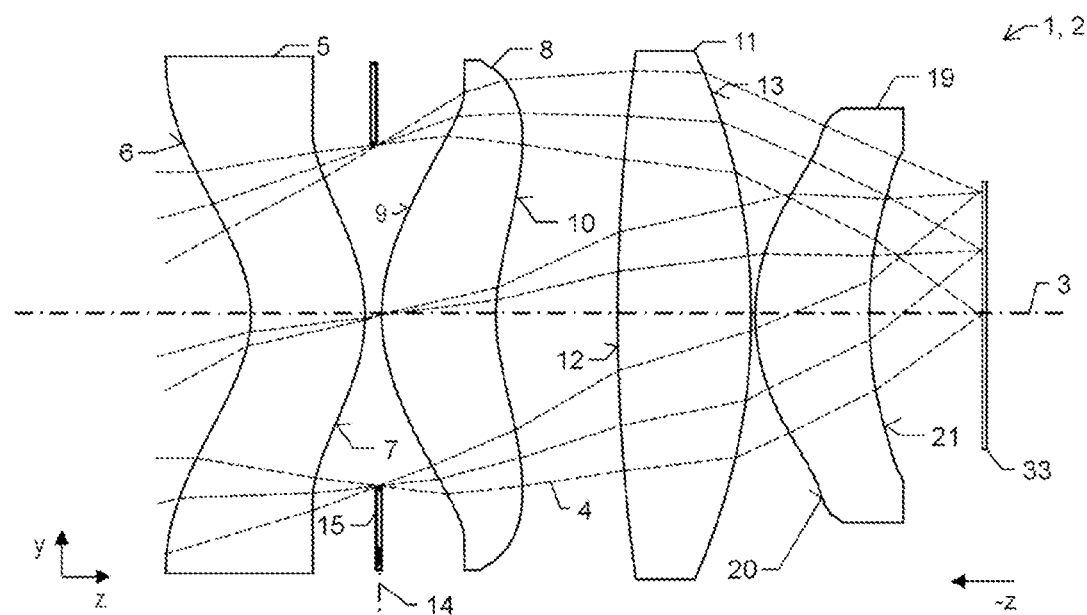
Fig. 28
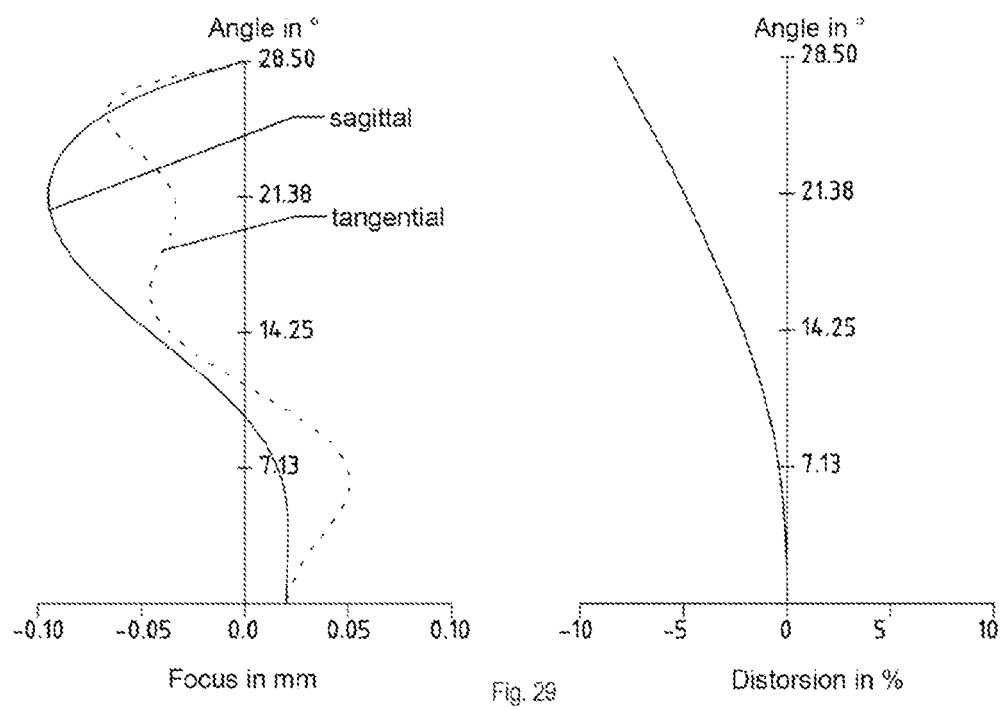
Fig. 29
Fig. 30

OBJECTIVE, USE OF AN OBJECTIVE, MEASUREMENT SYSTEM COMPRISING AN OBJECTIVE AND USE OF A BI-ASPHERICAL PLASTIC LENS IN AN OBJECTIVE

This nonprovisional application is a National Stage of International Application No. PCT/EP2021/062490, which was filed on May 11, 2021, and which claims priority to German Patent Application No. 10 2020 113 529.7, which was filed in Germany on May 19, 2020, and German Patent Application No. 10 2020 115 494.1, which was filed in Germany on Jun. 10, 2020 and which are all herein incorporated by reference.

BACKGROUND OF THE INVENTION

Field of the Invention

The invention relates to a cost-effective lens with a fixed focal length, which is suitable as an imaging lens. Such a lens is suitable in particular for use in a measurement system for a time-of-flight detection of a light beam (LIDAR). LIDAR is the abbreviation for light detection and ranging. The invention also relates to correcting field curvature. LIDAR lenses usually operate in a very small wavelength range in the near infrared, typically with a wavelength of 800-2000 nm. Lasers are often used for illumination. In this case, the lenses must be able to compensate for the narrow bandwidth of the laser source and for any wavelength drift that may occur with temperature. Moreover, a high imaging quality is needed.

Description of the Background Art

An imaging lens with seven lens elements is known from DE102015115460A1. The large number of lens elements is disadvantageous. An ultra-wide-angle lens is known from DE 102006057995A1. The large number of lens elements is disadvantageous. A further imaging lens is known from DE112013000682364. The limited imaging quality is disadvantageous. A further imaging lens is known from WO2016/110883A1. The small aperture angle and the limited imaging quality on account of the curvature of the image plane are disadvantageous. A further imaging lens is known from EP3220179 A1. The small aperture angle and the limited imaging quality are disadvantageous. A further imaging lens is known from U.S. Pat. No. 7,940,478 B2. The small aperture angle and the limited imaging quality are disadvantageous. A further imaging lens is known from JP2015018086 A. The limited imaging quality is disadvantageous. A further imaging lens is known from U.S. Pat. No. 9,915,803 B2. The large number of lens elements is disadvantageous. A further imaging lens is known from EP2725405 A1. The fact that it is difficult to integrate a diaphragm and the fact that there is also a drop in luminous intensity at the image field edge are disadvantageous. A further imaging lens is known from EP2725404 A1. The fact that it is difficult to integrate a diaphragm is disadvantageous. A further imaging lens is known from EP2657742 A1. The small aperture angle and the limited imaging quality are disadvantageous. A further imaging lens is known from WO2012/086194 A1. The small aperture angle and the limited imaging quality are disadvantageous. A further imaging lens is known from U.S. Pat. No. 6,707,621 B2. The small aperture angle and the limited imaging quality are disadvantageous.

A sensor with a SPAD array is known from WO2017180277A1. The SPAD array may comprise avalanche photodiodes (APD) and bipolar or field-effect transistors to activate a bias voltage (bias) row by row.

A LIDAR system with a VCSEL array and a SPAD array is known from CN205829628U.

An integrated illumination and detection system for LIDAR-based three-dimensional image recording is known from WO2017164989A1. A lens with four lens elements is proposed. A pulsed laser light source is proposed for illumination. In an embodiment, an array of a plurality of LIDAR measuring devices consisting of laser emitters and detectors is used. However, such a procedure is very complicated.

A LIDAR system with electrically controllable light direction-changing elements is known from WO2016204844A1.

A LIDAR system with a SPAD array as a detector is known from US2016161600A1. Laser beams are used for illumination and are controlled by means of photonic integrated circuits using optical phase arrays.

A vehicle LIDAR system with a solid-state laser and a deflectable mirror is known from WO2015189024A1.

A vehicle LIDAR system with a pulsed laser and a deflectable mirror and a CMOS image sensor is known from WO2015189025A1.

A LIDAR apparatus with an array of emitter/detector units is known from WO2015126471A1.

A vehicle LIDAR system with a VCSEL array for illumination is known from US2007181810A1.

A wide-angle lens with five lens elements is known from U.S. Pat. No. 8,654,457B2. The fact that four of the five lens elements will have to be manufactured from plastic for economic reasons is disadvantageous. This makes it difficult to realize athermalization of the lens.

SUMMARY OF THE INVENTION

The object of the invention is to provide a high-speed, cost-effective lens that is operable over a wide temperature range and has the best possible image-side telecentricity and low f-theta distortion, or the attainment of a specific desired distortion. Field curvature should be avoided as far as possible.

In particular, the lens should be suitable for LIDAR systems with detector arrays, for example SPAD arrays. In particular, the lens should be suitable for LIDAR systems without moving parts. Moreover, the lens can also be suitable for other applications as an imaging lens or as a projection lens. The lens should be able to be designed as both long range and close range.

The object is achieved by a lens as claimed in claim 1, the use as claimed in claim 15 and a measurement system as claimed in claim 13.

The lens can be manufactured cost-effectively and is particularly suitable for LIDAR applications. It is characterized by passive athermalization, good image-side telecentricity and low f-theta distortion, or by the possibility of attaining a desired distortion. It may also be suitable for other applications as an imaging lens or as a projection lens.

A lens according to the invention has a fixed focal length F. It has a field of view of more than 45° with respect to the optical axis. This can mean that the field of view can be more than 90° when measured as a full angle. For example, the design wavelength of the lens can be between 700 nm and 1100 nm or between 1400 nm and 1600 nm, for example at 905 nm, 915 nm, 940 nm, 1064 nm or 1550 nm. The lens can advantageously be designed as an f-theta lens.

At least a first surface, a second surface, a third surface, a fourth surface, a fifth surface, a sixth surface, a seventh surface, an eighth surface, a ninth surface, and a tenth surface are successively arranged in the beam path of the lens. Interfaces with an optical function, that is to say which lie in the beam path, can be understood to be surfaces. If the lens is provided as an imaging lens, the first surface can be the object-side surface and the tenth surface can be the image-side surface of the lens. If the lens is provided as a projection lens, the tenth surface can be the surface of the lens facing the light source.

The first surface and the second surface belong to a first lens element with a first focal length $f_1$. The first surface may be an air/material interface, the second surface may be a material/air interface, wherein material may refer to the material (e.g., glass or plastic) from which the lens is produced.

The third surface and the fourth surface belong to a second lens element with a second focal length $f_2$.

The fifth surface and the sixth surface belong to a third lens element with a third focal length $f_3$. The third lens element has a refractive index of greater than 1.7. As a result, a high imaging quality of the lens can be achieved. The third lens element can particularly advantageously have a refractive index of greater than 1.8.

The seventh surface and the eighth surface belong to a fourth lens element with a fourth focal length $f_4$. The ninth surface and the tenth surface belong to a fifth lens element with a fifth focal length $f_5$.

The focal length of a lens element can be understood to be the focal length with regard to paraxial (in the sense of near-axis) rays in an external medium with a refractive index of 1.

The first lens element is formed as a meniscus with a negative refractive power $D_1=1/f_1<0$. A meniscus lens element can be understood to be a convex-concave lens element. In this case, the first surface can be formed to be convex and the second surface can be formed to be concave. Advantageously, the concave side of the first lens element can be more curved than the convex side. This can be a meniscus with negative refractive power, which may also be referred to as a negative meniscus. Advantageously, the first lens element can be curved outwards, that is to say in a negative z direction. This may mean that the first lens element can be an outer lens element with respect to the lens and that the convex surface thereof can be arranged to the outside of the lens.

A diaphragm is arranged between the second lens element and the third lens element. The diaphragm may be an opening in a diaphragm component. The diaphragm component can be ring-shaped. By arranging the diaphragm in a diaphragm plane, the telecentricity error and/or the errors due to distortion can be reduced, and/or the vignetting can be minimized or avoided. The diaphragm plane can be located between the second and the third lens element, and particularly advantageously on the fifth surface.

The third lens element has a positive refractive power $D_3=1/f_3>0$. The sum $D_3+D_4+D_5$ of the refractive power $D_3=1/f_3$ of the third lens element and the refractive power $D_4=1/f_4$ of the fourth lens element and the refractive power $D_5=1/f_5$ of the fifth lens element is positive.

The ninth surface is formed to be aspherical and has a near-axis convex region and a peripheral concave region. A peripheral region can be understood to be a region containing the points outside a certain radius around the optical axis. This area can be formed to be ring-shaped. The ninth surface may have at least one point of inflection.

A point of inflection can be understood to be a point of inflection, defined in the mathematical sense, of a mathematical function z(y) of the respective lens element surface between the optical axis and the edge of the lens element surface. The function z(y) can be the z-coordinate of the lens element surface as a function of a radial coordinate y, which is perpendicular to the z-direction. In the case of a rotationally symmetrical surface, the function can also be specified as z(r) in a cylindrical coordinate system. The coordinate y=0 or r=0 can correspond to the optical axis in this case. A point of inflection of a lens element surface can describe the transition between a convex and a concave region of the respective lens element surface.

At least one of the seventh surface, eighth surface, and tenth surface is formed to be aspherical.

The following also applies:

$$\left|\frac{1}{f_2} + \frac{1}{f_4} + \frac{1}{f_5}\right| \leq \frac{0.15}{F}.$$

This can be accomplished by appropriate selection of the focal lengths of the lens elements.

The indices i of the focal lengths can be specified according to the number of the respective lens element. The reciprocal of any focal length is known to be its refractive power $D_i=1/f_1$. Thus, each of the lens elements can be assigned a refractive power $D_i$.

The lens can be particularly advantageous if the focal lengths are chosen such that $$\left|\frac{1}{f_2} + \frac{1}{f_4} + \frac{1}{f_5}\right| \leq \frac{0.12}{F}.$$

Particularly good passive athermalization of the lens can be achieved in that case.

The lens can advantageously have a focal length F of between 2 mm and 5 mm. The focal length $f_1$ of the first lens element can advantageously be between 0.7-times and 1.3-times, particularly advantageously between 0.8-times and 1.2-times, the focal length $f_2$ of the second lens element.

Glass lens elements and plastic lens elements can be used for the lens. The sum of the center thicknesses of the glass lens elements can advantageously be greater than the sum of the center thicknesses of the plastic lens elements.

The lens can have an overall length and an image circle diameter, the overall length advantageously being between two-times and five-times the image circle diameter.

Advantageously, the first lens element can consist of a first glass. Advantageously, the second lens element can consist of a first plastic. Advantageously, the third lens element can consist of a second glass. Advantageously, the fourth lens element can consist of a second plastic. Advantageously, the fifth lens element can consist of a third plastic. The features mentioned in this paragraph can be present individually or in a combination of a plurality thereof. Particularly advantageously, all of these features can be present at the same time.

The first glass and the second glass can be different glasses. The first and the second glass can differ in terms of the thermal expansion and/or the refractive index and/or the temperature dependence of the refractive index. Alternatively, however, it is also possible to use the same type of glass as the first and second glass. Optical glasses such as BK7 or borosilicate glass can be used to this end. High refractive index glasses, for example dense flint glasses (SF glasses), lanthanum-containing flint or crown glasses (for example LaF, LaSF or LaK glasses) or barium-containing flint or crown glasses (for example BaF or BaSF or BaK glasses) can be particularly suitable. Advantageously, the second glass can have a higher refractive index than the first glass. By way of example, the first glass can have a refractive index of between 1.50 and 1.55. A glass with a refractive index of more than 1.7, particularly advantageously of more than 1.8, can be used as the second glass. The second glass may be a high refractive index lanthanum flint glass.

The first plastic, the second plastic, and the third plastic can be different plastics. The plastics can differ in terms of the thermal expansion and/or the refractive index and/or the temperature dependence of the refractive index. Alternatively, it is, however, also possible and, in some circumstances, even advantageous to use the same type of plastic multiple times. It may be particularly advantageous to produce all plastic lens elements from one and the same plastic. A plastic can be understood to be a polymer. A transparent polymer, that is to say a see-though polymer, can be particularly advantageous. Polycarbonate, COP, COC (topaz) or OKP can be particularly suitable. PMMA can also be suitable.

The Abbe number of the third lens element can advantageously be less than 35. Advantageously, the Abbe numbers of the second, fourth and fifth lens elements can all be either between 50 and 65 or between 18 and 32. This selection ensures the desired imaging properties of the lens over a wide temperature range.

The lens can have an optical axis. The optical axis can be considered to be the z-axis of a rectangular Cartesian coordinate system xyz. In the case of rotational symmetry, the x and y coordinates can be replaced by a radial coordinate r perpendicular to the optical axis.

In addition, the lens can include other elements, such as a ring diaphragm, filter, polarizer, etc. Compared to lenses with more than five lens elements, the lens according to the invention can be produced more cost-effectively. Advantageously, the further elements can be designed without refractive power, that is to say without curvature of the optical interfaces.

Advantageously, the first lens element and/or the second lens element can have at least one aspherical surface. Particularly advantageously, the third surface, and very particularly advantageously the third surface and the fourth surface, can be formed to be aspherical.

Advantageously, the seventh surface, eighth surface, ninth surface, and tenth surface can all be formed to be aspherical.

Advantageously, the eighth surface and/or the tenth surface can each have at least one point of inflection between the optical axis and the edge of the respective surface.

Advantageously, at least three of the third surface, seventh surface, eighth surface, and tenth surface can each have at least one point of inflection. Field curvature and/or astigmatism and/or distortion of the lens can be corrected by means of the points of inflection.

Advantageously, the tenth surface can be formed to be concave. This can be understood to mean that there is a positive curvature with respect to the +z-direction in certain regions of the surface or everywhere. Advantageously, the tenth surface can be formed to be without points of inflection. This can mean that there might be points with a curvature of zero, but no convexly curved points. Particularly advantageously, a first derivative $dz/dy$ of the z-coordinate of the tenth surface with respect to a y-direction in a plane $x=0$ moreover can have at least one point of inflection between the optical axis and the edge of the surface. In the case of a rotationally symmetrical surface, it is also possible to use $dz(r)/dr$ in a cylindrical coordinate system. The coordinate $y=0$ or $r=0$ can correspond to the optical axis in this case. There can also be multiple, for example two or three, points of inflection of the first derivative. Field curvature and/or astigmatism and/or distortion can be corrected particularly well by these measures.

Advantageously, the fifth surface can be formed as a flat surface. Particularly advantageously, the diaphragm can be arranged on the fifth surface. In this case, the diaphragm can then be made very thin or the contact surface of the lens element can be used as a diaphragm at the same time. The diaphragm can also be designed, for example, as an absorbent layer on the fifth surface.

A spherical lens element can be understood to be a lens element that has two opposing spherical optical surfaces. A spherical lens element can also be called a bi-spherical lens element. One of the spherical surfaces can be a flat surface. A flat surface can be understood to be a spherical surface with an infinite radius of curvature.

An aspherical lens element can be defined as a lens element with at least one aspherical optical surface. The second lens element can also be designed as a bi-aspheric lens element. A bi-aspheric lens element can be understood to be a lens element that has two opposing aspherical optical surfaces. The second lens element can have at least one free-form surface.

It may be advantageous if the first lens element and the third lens element are formed as spherical lens elements, and if the second, the fourth, and the fifth lens element are formed as aspherical lens elements, that is to say with at least one aspherical surface each. In a particularly advantageous manner, the second lens element and the fifth lens element can be embodied as bi-aspheric lens elements. In a very particularly advantageous manner, the second lens element, the fourth lens element, and the fifth lens element can be embodied as bi-aspheric lens elements.

An image plane of the lens can be arranged after the last lens element in the z-direction. An object plane can be arranged in front of the first lens element. In this case, the lens can be an imaging lens. An image sensor for recording an image or a matrix sensor for detecting the time-of-flight of light beams can be arranged in the beam path after the last lens element, advantageously in the image plane of the lens. The light rays can propagate from the object to the image plane with a component in the z-direction.

Likewise advantageously, a beam path can be provided in a −z-direction. A light source, the fifth lens element, the fourth lens element, the third lens element, the second lens element, and the first lens element can be arranged to this end. In this case, the lens can be used to illuminate objects or scenes located in front of the first lens element in the −z-direction. The light rays can propagate from the light source to the object or scene to be illuminated with a component in the −z-direction. A scene can be understood as a number of objects that are intended to be detected and/or illuminated within a specific solid angle range.

Advantageously, the lens can be formed to be approximately telecentric on the image side. This can be understood to mean that the image-side telecentricity error is less than 10°. This design of the lens can be particularly advantageous if a filter, for example a bandpass filter, is arranged between the fourth lens element and the image plane. Such an advantageous arrangement can moreover comprise an image sensor for image recording or a matrix sensor for time-of-flight detection of a light beam, which sensor can be arranged in the image plane. With such an arrangement of the lens and the filter, it is possible to avoid an inhomogeneity in the illumination of the image plane as a consequence of different angles of incidence on the filter. Filter angular acceptance range requirements may be reduced in comparison with a non-telecentric lens. This allows the filter to be more cost-effective. An image-side telecentricity error can be understood to be the angular deviation between the optical axis and the chief rays between the last lens element and the image sensor. The rays that intersect with the optical axis in the diaphragm plane can be referred to as chief rays. If there is no diaphragm, the chief rays can be assumed to be the rays with the mean angle with respect to the ray bundle striking the image plane at a specific point in each case. Advantageously, the fourth lens element can be formed to be biconvex. Likewise advantageously, the eighth surface of the fourth lens element can be formed to be concave in a near-axis region and convex in a peripheral region.

The lens can advantageously have a lens speed of at least 1:1.3. Lens speed can be described as the maximum aperture ratio of the lens. The reciprocal of the lens speed can be referred to as the f-number. The condition can also be expressed in such a way that the f-number should be less than 1.3.

The lens can advantageously comprise a bandpass filter for separating the signal light from the light source from the ambient light, in particular from daylight. However, a bandpass filter can also be arranged in the beam path outside the lens.

The lens can be operable as a projection lens. However, it can also be operable as an imaging lens.

The use of the lens can be advantageous for a measurement system for at least detecting a time-of-flight of at least one light beam. The measurement system can advantageously comprise at least one lens, at least one light source and at least one matrix sensor. The light source can be a laser beam source or an LED. The light source can be operated in pulsed fashion. The pulse length can be between 1 ns and 1 ms.

The measurement system can be characterized in that the matrix sensor is a SPAD array and/or in that the light source is a VCSEL array or an LED array.

The lens can include one or more spacers arranged between two lens elements in each case. The spacers can advantageously be made of polycarbonate or glass fiber reinforced plastic. Alternatively, it may be made of a metal such as aluminum or steel.

The lens can have a focal length, a pixel size, a modulation transfer function, and a distortion in the image plane. The focal length of the lens and/or at least one of the optical properties of pixel size, modulation transfer function, image size, distortion in the image plane can be temperature-independent over a temperature range at a first wavelength without the use of active components. This may be referred to as passive athermalization.

Passive athermalization can be achieved through the aforementioned selection of the lens element materials in conjunction with the aforementioned restrictions on the focal length ratios.

The lens can be designed for a single wavelength (design wavelength), for example that of a specific laser radiation, for example 780 nm, 808 nm, 880 nm, 905 nm, 915 nm, 940 nm, 980 nm, 1064 nm, or 1550 nm. However, the lens can also be designed for a specific bandwidth, for example for the visible wavelength range or the near infrared range, or for a number of discrete wavelengths. The bandwidth provided can also be 20 nm to 50 nm, for example, in order to be able to compensate for a thermal wavelength drift of a diode laser provided for illumination, for example.

The lens can be operated as a projection lens. By way of example, a laser beam can be projected linearly or areally into a portion of space.

The lens can be operated as an imaging lens. A light beam reflected from an object, for example a laser beam, which has been reflected from a point on the object can be projected onto a point on the detector. The time-of-flight of this light beam can be detected using the detector.

In a preferred embodiment, the lens can be used simultaneously as a projection lens and as an imaging lens. The laser beam to be projected can be coupled into the beam path by means of a beam splitter arranged in the beam path between the lens and the detector.

The lens can be designed as a wide-angle lens with an opening angle (full angle) of more than 90°, particularly advantageously more than 120° and very particularly advantageously more than 135°.

Advantageously, the lens can have an overall length that is between six times and ten times the focal length F.

A further advantageous embodiment of the invention lies in the use of a plastic bi-aspheric lens element for correcting field curvature and/or astigmatism and/or distortion of an imaging lens. A correction of the distortion can be understood to mean that the deviation from a desired distortion should be small. For example, this may relate to the matter of avoiding a distortion or avoiding deviations from a desired distortion (target distortion). Advantageously, the imaging lens can be designed as an f-theta lens. The imaging lens comprises at least four lens elements, advantageously at least five lens elements and likewise advantageously exactly four lens elements or particularly advantageously exactly five lens elements. The plastic bi-aspheric lens element has a light entry surface with a near-axis convex region and a peripheral concave region. At least one point of inflection may be present between the optical axis and the edge of the light entry surface. The plastic lens element also has a light exit surface. The light exit surface of the plastic lens element is formed to be concave. This can be understood to mean that the mean value of the curvature is positive with respect to a light propagation direction +z. Moreover, the light exit surface is formed without points of inflection. This can mean that the value of the curvature does not change sign. In particular, the curvature can be greater than or equal to zero over the entire surface, which means that the curvature does not assume a negative value. According to the invention, a first derivative $dz(y)/dy$ of the z-coordinate of the light exit surface of this plastic lens element with respect to a y-direction in a plane $x=0$ has at least one point of inflection between the optical axis and the edge of the light exit surface. This design of the lens element surfaces enables a particularly effective correction of the field curvature. Moreover, a corrective lens element designed in this way is less sensitive to tolerances in comparison to known lens elements, which also have one or more points of inflection on the light exit side. There can also be multiple, for example two or three, points of inflection of the first derivative. Particularly advantageously, there can be exactly one, exactly two or exactly three points of inflection of the first derivative $dz(y)/dy$ between the optical axis and the edge of the light exit surface.

The first derivative $dz(y)/dy$ of the z-coordinate of the light exit surface of this plastic lens element with respect to the y-direction can be differentiable a further time. The second derivative $d^2z(y)/dy^2$ can represent the curvature of the lens element. A local extremal value (local minimum or local maximum) of the curvature can be regarded as a necessary—but not sufficient—condition for the existence of a point of inflection of the first derivative at the corresponding point.

The curvature of the light exit surface of the plastic bi-aspheric lens element can have at least one local maximum and at least one local minimum between the optical axis and the edge of the surface. A global maximum of the curvature can be present, but need not be present, at the edge of the lens element. Alternatively, the largest of the local maxima can be the global maximum at the same time and can be at a distance from the edge of the lens element. The local minima can all be non-negative, that is to say ≥0.

It may be advantageous, in a first embodiment, to provide a global maximum of curvature at the edge of the light exit surface and, spaced apart from the edge, at least one local maximum of curvature and at least one local minimum of curvature, which can be arranged between the local maximum and the global maximum located at the edge. This embodiment can be particularly advantageous if the local maximum or the largest of the local maxima is greater than 0.04/mm and the local minimum or the smallest of the local minima is less than a third of this value. Advantageously, the global maximum can be more than 0.4/mm.

Alternatively, it may also be advantageous in a second embodiment of the light exit surface of the plastic bi-aspheric lens element to provide at least one local maximum of the curvature, which is the global maximum at the same time, and to advantageously arrange the latter at a distance from the edge of the light exit surface of at least 5% of the radius of the light exit surface. There may be a lower curvature at the edge of the lens element in comparison with this global maximum. In this second embodiment, it may be particularly advantageous to provide a second local maximum of the curvature closer to the optical axis. The second maximum can be located on the optical axis, with at least two points of inflection of the first derivative $dz(y)/dy$ being able to be present between the optical axis and the edge in this case. Alternatively, the second maximum can particularly advantageously be located at a distance from the optical axis, with at least three points of inflection of the first derivative $dz(y)/dy$ being able to be present between the optical axis and the edge in this case. A local minimum may be present between the global maximum of curvature and the closest local maximum. Overall, a plurality of local minima of the curvature may be present. The local minima can all be non-negative, that is to say ≥0. It may be advantageous to choose the local minimum or the smallest of the local minima to be less than 0.02/mm. The y-coordinate of the edge of the light exit surface can be understood to be the radius of the light exit surface.

The edge of the light exit surface can be the ray of the intended beam path that is furthest away from the optical axis. The edge can therefore delimit the optically functional lens element surface. Said lens element can be designed to be rotationally symmetric with respect to the optical axis z. Then, the first derivative can be expressed as $dz(r)/dr$. The coordinate $y=0$ or $r=0$ can correspond to the optical axis in this case.

The plastic bi-aspheric lens element described herein, especially in the above-described first or second embodiment, can advantageously be arranged furthest on the image side. Thus, it can particularly advantageously be used as the fifth lens element in the above-described lens according to the invention.

The use of a lens with a fixed focal length F can be advantageous for a measurement system for at least detecting a time-of-flight of at least one light beam. The light beam can be a laser beam. The light beam can be emitted by a light source. The light source can be an optically pumped solid state laser or an electrically pumped diode laser. The light source can be arranged on a vehicle together with the lens according to the invention and a detector. The light source can be designed in such a way that individual light pulses are able to be emitted. A photoelectric detector can be provided for the time-of-flight detection of the light beam. The detector can be an avalanche photodiode, for example a single-photon avalanche diode (abbreviated SPAD). The detector may comprise a plurality of avalanche photodiodes. These can be configured as a SPAD array.

A measurement system according to the invention comprises at least one lens according to the invention, at least one light source and at least one matrix sensor. The light source can emit at least one signal light. This can differ in terms of the wavelength from the ambient light. Advantageously, the light source can be a laser light source. It can be an infrared laser. Alternatively, the light source can be an LED.

The light source can be operated in pulsed fashion. The pulse length can be between 1 ns and 1 ms.

In a further embodiment, the light source can comprise a plurality of light-emitting elements which are operable independently of one another. The light source can be in the form of a VCSEL array or an LED array. Operation of the light source can be provided, within the scope of which at least two of the light-emitting elements emit light pulses at different points in time.

The matrix sensor can be a SPAD array.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 28 shows a fourth exemplary embodiment.

FIG. 29 shows the astigmatism of the fourth exemplary embodiment.

FIG. 30 shows the f-tan theta distortion of the fourth exemplary embodiment.

DETAILED DESCRIPTION

The invention will be explained below with reference to exemplary embodiments.

Figure 1:
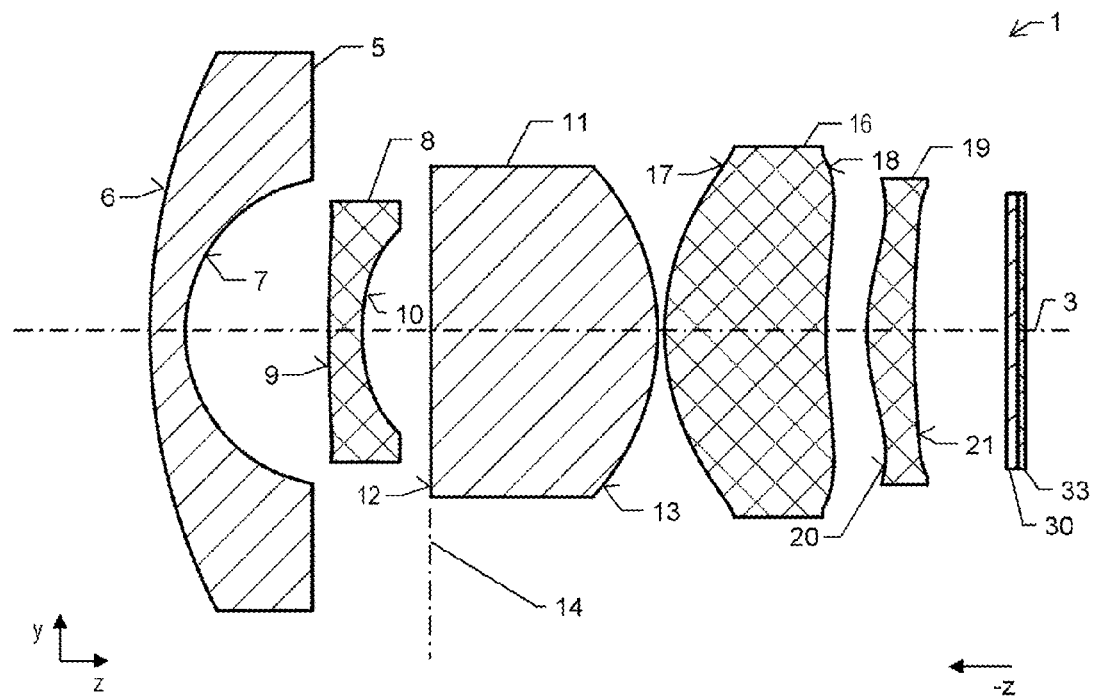
FIG. 1 shows a first exemplary embodiment.

FIG. 1 shows a first exemplary embodiment. Shown is a lens 1 with a fixed focal length F, with a first surface 6, a second surface 7, a third surface 9, a fourth surface 10, a fifth surface 12, a sixth surface 13, a seventh surface 17, an eighth surface 18, a ninth surface 20, and a tenth surface 21 being successively arranged in the beam path. The lens has an optical axis 3. The optical axis is in the z-direction. In the figures, the image plane is on the right, that is to say in the z-direction, while the object plane is located to the left of the lens. The lens comprises a first lens element 5, a second lens element 8, a third lens element 11, a fourth lens element 16, and a fifth lens element 19. The lens elements are successively arranged in the z-direction in the order mentioned.

The first lens element is a negative refractive power spherical meniscus lens element, that is to say it has two opposing spherical optical surfaces.

The third lens element 11 has a positive refractive power.

The second lens element 8 is made of a first plastic. The second lens element 8 is in the form of a diverging bi-aspheric lens. The third lens element 11 is made of a second glass. The third lens element 11 is a converging spherical lens.

The fourth lens element 16 is in the form of a converging bi-aspheric lens. It is made from a second plastic. In this case, the second plastic is the same as the first plastic.

The fifth lens element 19 is designed as shown in FIG. 10, FIG. 11, FIG. 12, FIG. 13, and FIG. 14 and explained further below.

In addition, a filter 30 which separates the signal light from the ambient light can optionally be provided in front of the matrix sensor 33.

Figure 2:
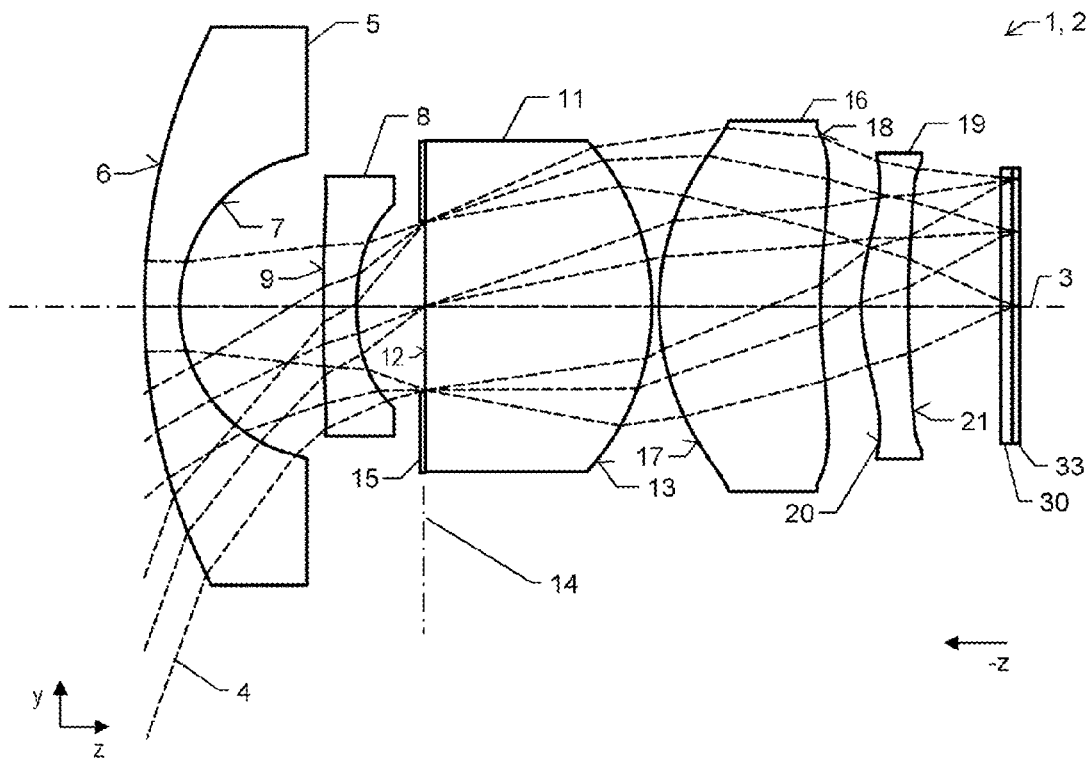
FIG. 2 shows the beam path of the first exemplary embodiment.

FIG. 2 shows the beam path of the first exemplary embodiment. In this figure and the further figures, the hatching of the lens elements has been omitted in order to be able to show the light rays 4, which represent the beam path 2, better. A diaphragm 15 is arranged between the second lens element 8 and the third lens element 11. The diaphragm plane 14 is located on the fifth surface 12, which is in the form of a flat surface. An image sensor for recording an image or a matrix sensor for detecting the time-of-flight of a light beam is arranged in the image plane 33.

The optical design in the variant without filter is implemented according to table 1 below:

TABLE 1

| No. | Type | Comment | Radius of curvature KR in mm | Thickness/ distance in mm | Material | Radius in mm |
|---|---|---|---|---|---|---|
| 1 | STANDARD | Object | ∞ | ∞ | Air | |
| 2 | STANDARD | Surface 1 | 19.770000 | 1.132000 | Glass 1 (n = 1.5168) | 8.970777 |
| 3 | STANDARD | Surface 2 | 4.982000 | 4.616000 | Air | 4.900000 |
| 4 | ASPHERE | Surface 3 | −322.400000 | 1.061000 | Polymer 1 (n = 1.5300) | 4.185478 |
| 5 | ASPHERE | Surface 4 | 7.544000 | 2.200000 | Air | 3.282936 |
| 6 | STANDARD | Diaphragm | ∞ | 0.000000 | Air | 2.701642 |
| 7 | STANDARD | Surface 5 | ∞ | 7.268000 | Glass 2 (n = 1.9037) | 2.901642 |
| 8 | STANDARD | Surface 6 | −7.848000 | 0.228900 | Air | 5.319136 |
| 9 | ASPHERE | Surface 7 | 7.989000 | 5.179000 | Polymer 2 (n = 1.5300) | 5.963481 |
| 10 | ASPHERE | Surface 8 | 15.860000 | 1.308000 | Air | 5.715791 |
| 11 | ASPHERE | Surface 9 | 6.849000 | 1.508000 | Polymer 3 (n = 1.5300) | 4.921023 |
| 12 | ASPHERE | Surface 10 | 40.000000 | 3.300000 | Air | 4.662680 |
| 13 | STANDARD | Image | ∞ | 0.000000 | | 5.000000 |

The first column provides an index, which is numbered from the object side. The "standard" type designates a flat or spherically curved surface. The "ASPHERE" type designates an aspherical surface. An interface or lens element surface can be understood to be a surface. Attention is drawn to the fact that the object plane (No. 1), a diaphragm (No. 6), and the image plane (No. 13) are also numbered in the first column. The lens element surfaces specified in the description and in the set of claims are given as a comment.

The radius of curvature KR column indicates the radius of curvature of the respective surface. In the case of an aspherical surface, this should be understood to mean the paraxial radius of curvature. In the table, the sign of a radius of curvature is positive if the shape of a surface is convex toward the object side, and the sign is negative if the shape of a surface is convex toward the image side. The specification ∞ in the radius of curvature column means that this relates to a flat surface. The distance between the i-th surface and the (i+1)-th surface on the optical axis is specified in the "thickness/distance" column. The specification ∞ in this column in No. 1 means that the object distance is infinite, that is to say a lens focused at infinity. For rows 2, 4, 7, 9, and 11, this column gives the center thickness of the first, second, third, fourth, and fifth lens element, respectively. In the material column, the material between the respective surfaces is specified with the respective refractive index n. In this case, the specified refractive index n refers to the sodium D line commonly used. The radius column indicates the outer radius of the respective surface. In the case of the diaphragm (No. 6), this is the aperture. In the case of the lens element surfaces, this is the maximum usable distance of the light rays from the optical axis. In the equation below, this corresponds to the maximum value h for the respective surface.

The coefficients of the aspherical surfaces for the respective index from column 1 of table 1 are given in the two subsequent tables, table 2 and table 3, below.

TABLE 2

| No. | $C_2$ in mm-1 | $C_4$ in mm-3 | $C_6$ in mm-5 | $C_8$ in mm-7 |
|---|---|---|---|---|
| 4 | 0 | 1.8929E-03 | -1.3862E-04 | 5.6479E-06 |
| 5 | 0 | 3.8511E-03 | -1.1177E-07 | 0.0000E00 |
| 9 | 0 | -1.9215E-04 | 1.1981E-05 | -9.0353E-07 |
| 10 | 0 | -1.4834E-03 | 2.1040E-05 | 2.4410E-06 |
| 11 | 0 | -1.9231E-03 | -7.9651E-05 | 1.8942E-06 |
| 12 | 0 | 1.9405E-03 | -4.5728E-04 | 4.7035E-05 |

TABLE 3

| No. | $C_{10}$ in mm-9 | $C_{12}$ in mm-11 | $C_{14}$ in mm-13 | $C_{16}$ in mm-15 |
|---|---|---|---|---|
| 4 | -2.9882E-07 | 7.5065E-09 | 0.0000E00 | 0.0000E00 |
| 5 | 0.0000E00 | 0.0000E00 | 0.0000E00 | 0.0000E00 |
| 9 | 4.9619E-08 | -2.1430E-09 | 5.1996E-11 | -5.9086E-13 |
| 10 | -1.8093E-07 | 3.5743E-09 | -1.2977E-11 | -1.5515E-13 |
| 11 | 0.0000E00 | 0.0000E00 | 0.0000E00 | 0.0000E00 |
| 12 | -2.4843E-06 | 4.3636E-08 | 1.4519E-09 | -4.8891E-11 |

In the numerical values of the aspherical data, "E−n" (n: integer) means "x10−n" and "E+n" means "x10+n". Furthermore, the aspherical surface coefficients are the coefficients $C_m$ with m=2, ..., 16 in an aspherical expression that is represented by the following equation:

$$Zd = \frac{h^2}{KR + \sqrt{KR^2 - (1+k)h^2}} + \sum_{m=2}^{16} C_m \cdot h^m,$$

where

Zd is the depth of an aspherical surface (i.e., the length of a perpendicular from a point on the aspherical surface at a height h to a plane touching the apex of the aspherical surface and perpendicular to an optical axis), h is the height (i.e., a length from the optical axis to the point on the aspherical surface), KR is the paraxial radius of curvature, and $C_m$ are the aspherical surface coefficients (m=2, ..., 16) given below. Unspecified aspherical surface coefficients, here all with an odd index, are to be assumed to be zero. The coordinate h is to be entered in millimeters, just as the radius of curvature; the result Zd is obtained in millimeters. The coefficient k is the conicity coefficient. The statements made in this paragraph also apply to all other following exemplary embodiments.

The conicity coefficient k is zero for all surfaces in the present first exemplary embodiment.

The focal length of the first lens element is $f_1$=−13.45 mm, that of the second lens element is $f_2$=−14.08 mm. The focal length of the third lens element is $f_3$=8.94 mm, that of the fourth lens element is $f_4$=25.11 mm and that of the fifth lens element is $f_5$=15.56 mm. The lens has a focal length F of 3.46 mm.

In a modification of this exemplary embodiment, the lens is focused at a finite object distance. This can be implemented by changing the image distance. To this end, the distance in line No. 12 can be increased accordingly.

In a further modification, not shown, the lens can be used as a projection lens. To this end, a light source is arranged in plane 33 instead of the sensor. Then a scene located in front of the lens in the negative z direction, identified as −z direction in FIG. 1, can be illuminated.

Figure 3:
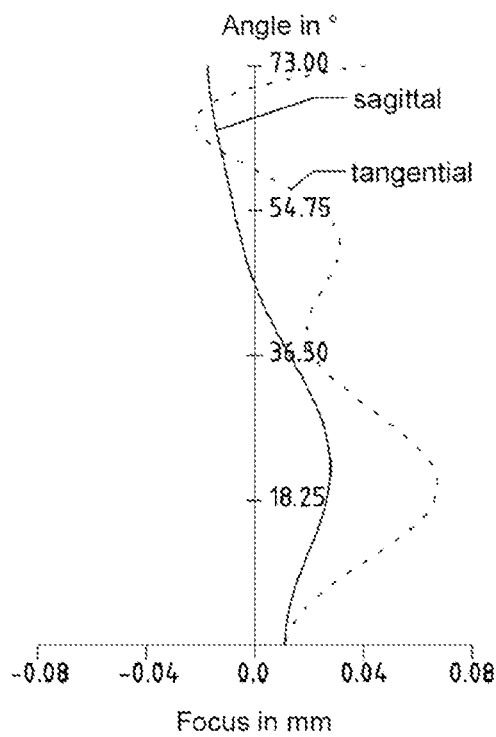
FIG. 3 shows the astigmatism of the first exemplary embodiment.

FIG. 3 shows the astigmatism of the first exemplary embodiment. All astigmatism diagrams show the focal position on the horizontal axis and the angle of incidence on the vertical axis. The designation "sagittal" designates the sagittal image and the designation "tangential" designates the tangential image, which can also be designated as a meridional image.

Figure 4:
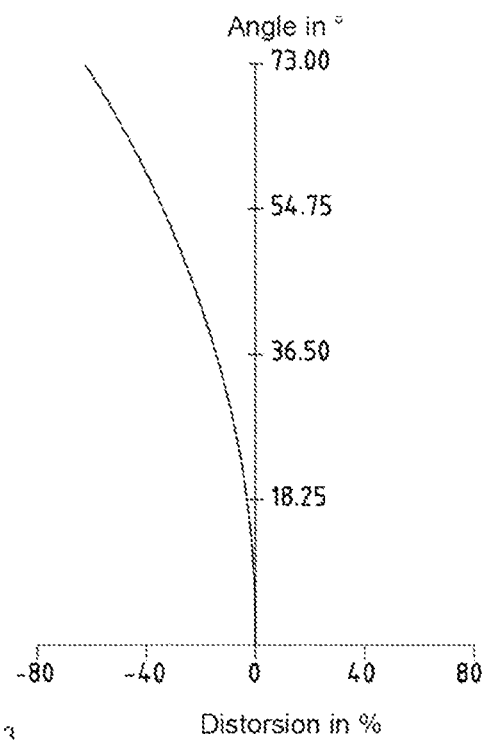
FIG. 4 shows the f-tan theta distortion of the first exemplary embodiment.

FIG. 4 shows the f-tan theta distortion of the first exemplary embodiment. All distortion diagrams show the distortion in % on the horizontal axis and the angle of incidence on the vertical axis.

Figure 5:
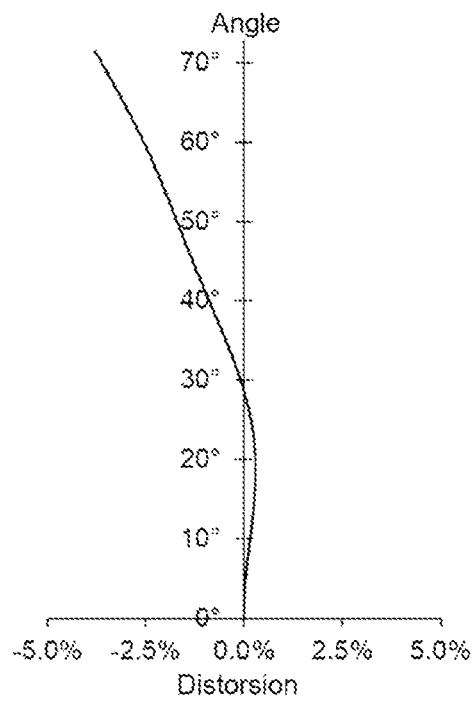
FIG. 5 shows the f-theta distortion of the first exemplary embodiment.

FIG. 5 shows the f-theta distortion of the first exemplary embodiment.

Figure 6:
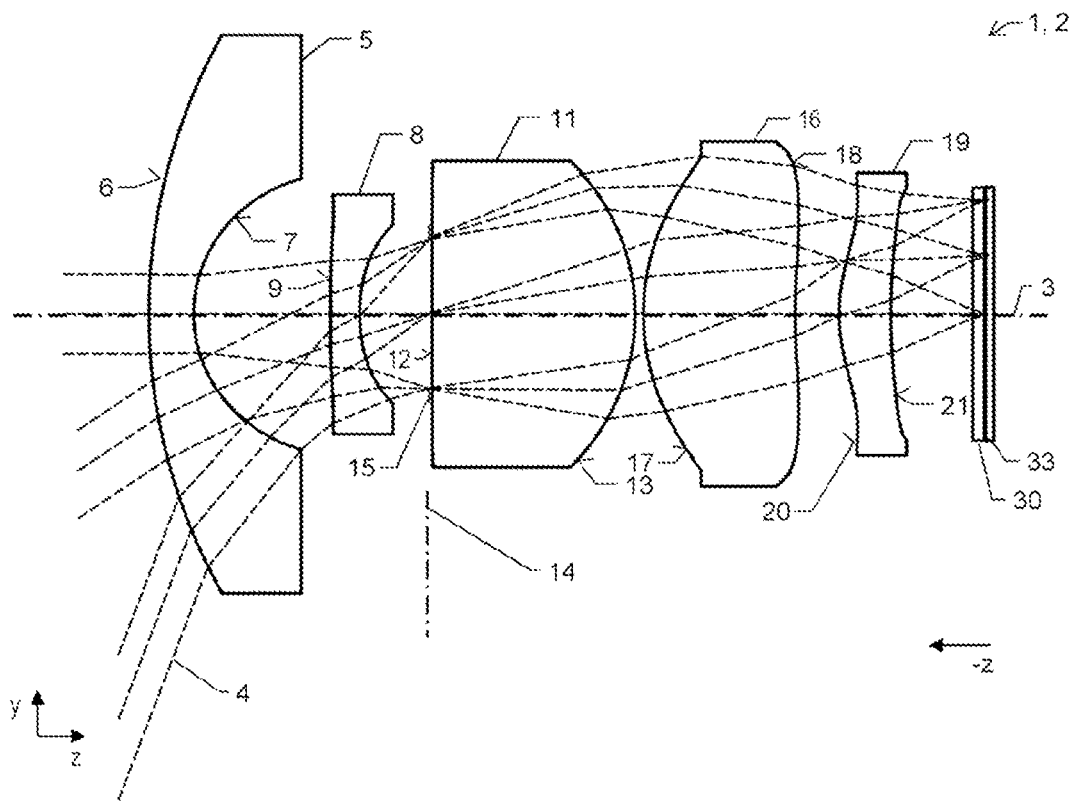
FIG. 6 shows a second exemplary embodiment.
Figure 15:
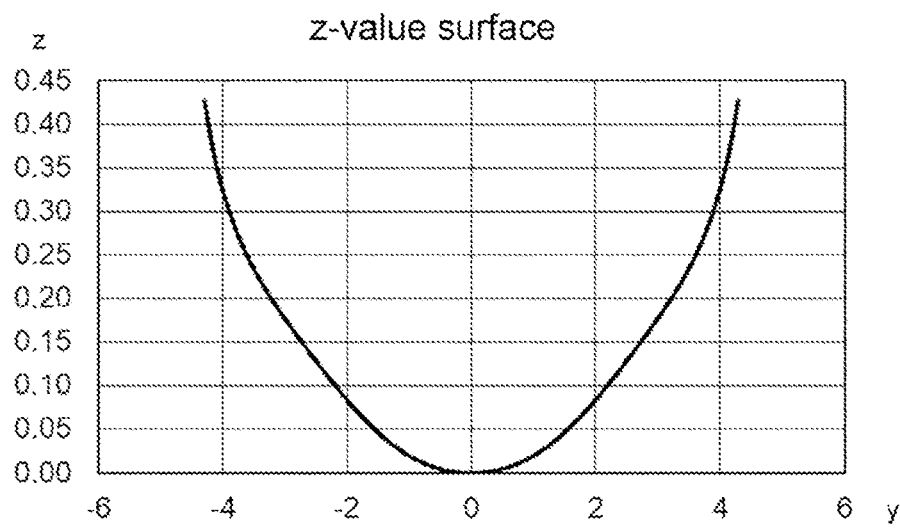
FIG. 15 shows the light exit surface of a further plastic lens element.
Figure 16:
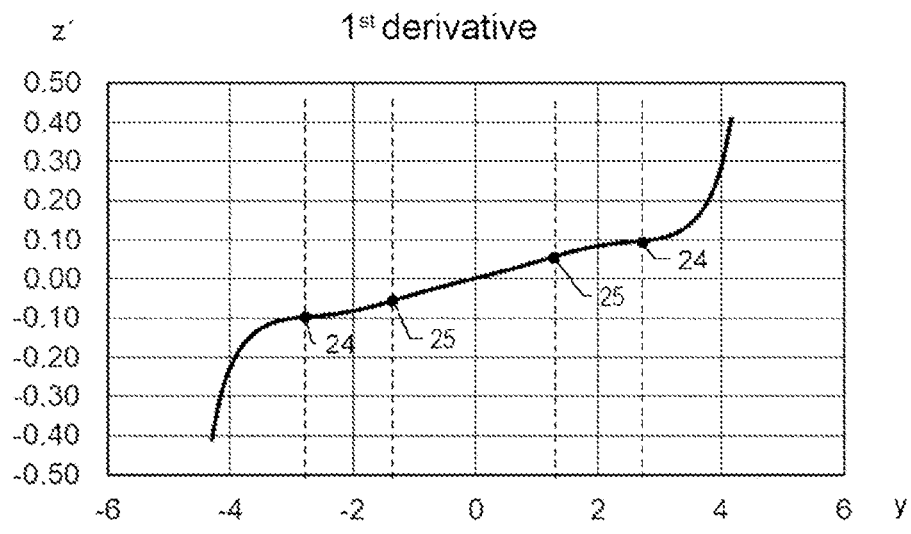
FIG. 16 shows the first derivative of the light exit surface.
Figure 17:
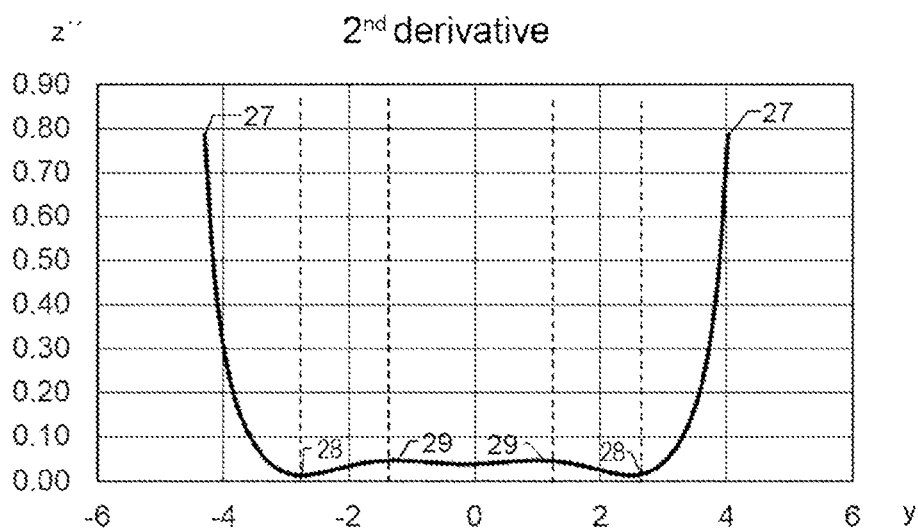
FIG. 17 shows the second derivative of the light exit surface.

FIG. 6 shows a second exemplary embodiment. This is described in the following paragraphs. In the second embodiment, a bi-aspheric lens from FIG. 15, FIG. 16, and FIG. 17 is used as the fifth lens element 19. Corresponding to the explanations given under the first exemplary embodiment, the optical design of the second exemplary embodiment is implemented according to table 4 below:

TABLE 4

| No. | Type | Comment | Radius of curvature KR in mm | Thickness/ distance in mm | Material | Radius in mm |
|---|---|---|---|---|---|---|
| 1 | STANDARD | Object | ∞ | ∞ | Air | |
| 2 | STANDARD | Surface 1 | 20.924016 | 1.570690 | Glass 1 (n = 1.5168) | 9.504763 |
| 3 | STANDARD | Surface 2 | 4.904248 | 4.490025 | Air | 4.808687 |
| 4 | ASPHERE | Surface 3 | 26.365451 | 1.040302 | Polymer 1 (n = 1.5300) | 3.986409 |
| 5 | ASPHERE | Surface 4 | 6.865847 | 2.271235 | Air | 3.075385 |
| 6 | STANDARD | Diaphragm | ∞ | 0.068453 | Air | 2.615000 |
| 7 | STANDARD | Surface 5 | 493.296366 | 6.836047 | Glass 2 (n = 1.9037) | 2.709185 |
| 8 | STANDARD | Surface 6 | −7.808490 | 0.200000 | Air | 4.982316 |
| 9 | ASPHERE | Surface 7 | 8.080616 | 5.129109 | Polymer 2 (n = 1.5300) | 5.681749 |
| 10 | ASPHERE | Surface 8 | 18.165906 | 1.396368 | Air | 5.451244 |
| 11 | ASPHERE | Surface 9 | 6.328728 | 1.794420 | Polymer 3 (n = 1.5300) | 4.654312 |
| 12 | ASPHERE | Surface 10 | 26.365451 | 2.680000 | Air | 4.297779 |
| 13 | STANDARD | Image | ∞ ∞ | 0.000000 | | 5.000000 |

The coefficients of the aspherical surfaces (surfaces of the asphere type with the index in column 1 specified in table 4 above) given in the following tables, table 5 and table 6, were used:

TABLE 5

| No. | $C_2$ in mm-1 | $C_4$ in mm-3 | $C_6$ in mm-5 | $C_8$ in mm-7 |
|---|---|---|---|---|
| 4 | 0 | 2.0640E−03 | −1.8390E−04 | 7.5156E−06 |
| 5 | 0 | 4.1140E−03 | −6.2569E−05 | 0.0000E00 |
| 9 | 0 | −3.2401E−04 | 2.8561E−05 | −2.8433E−06 |
| 10 | 0 | −2.2771E−03 | 1.2112E−04 | −7.6327E−06 |
| 11 | 0 | −2.4015E−03 | −8.7228E−05 | 2.5882E−06 |
| 12 | 0 | 1.3413E−03 | −3.0440E−04 | 3.2103E−05 |

TABLE 6

| No. | $C_{10}$ in mm-9 | $C_{12}$ in mm-11 | $C_{14}$ in mm-13 | $C_{16}$ in mm-15 |
|---|---|---|---|---|
| 4 | −3.2934E−07 | 7.6917E−09 | 0.0000E00 | 0.0000E00 |
| 5 | 0.0000E00 | 0.0000E00 | 0.0000E00 | 0.0000E00 |
| 9 | 1.7810E−07 | −7.0211E−09 | 1.5061E−10 | −1.3976E−12 |
| 10 | 4.4701E−07 | −1.8247E−08 | 4.0458E−10 | −3.7038E−12 |
| 11 | 0.0000E00 | 0.0000E00 | 0.0000E00 | 0.0000E00 |
| 12 | −2.6772E−06 | 1.8024E−07 | −7.1280E−09 | 1.2002E−10 |

Unspecified aspherical surface coefficients, here all with an odd index, are to be assumed to be zero. The conicity coefficients k of all surfaces are likewise equal to zero in this example.

The focal length of the first lens element is $f_1$=−13.03 mm, that of the second lens element is $f_2$=−18.08 mm. The focal length of the third lens element is $f_3$=8.81 mm, that of the fourth lens element is $f_4$=23.69 mm and that of the fifth lens element is $f_5$=15.45 mm. The lens has a focal length F of 3.51 mm.

In a modification of this exemplary embodiment, the lens is focused at a finite object distance. This can be implemented by changing the image distance. To this end, the distance in line No. 12 can be increased accordingly.

In a further modification, not shown, the lens can be used as a projection lens. To this end, a light source is arranged in plane 33 instead of the sensor. Then a scene located in front of the lens in the negative z-direction can be illuminated.

The design wavelength of the first and second exemplary embodiment is 940 nm. Modifications of the exemplary embodiments can also be used at other wavelengths listed in the description.

Figure 7:
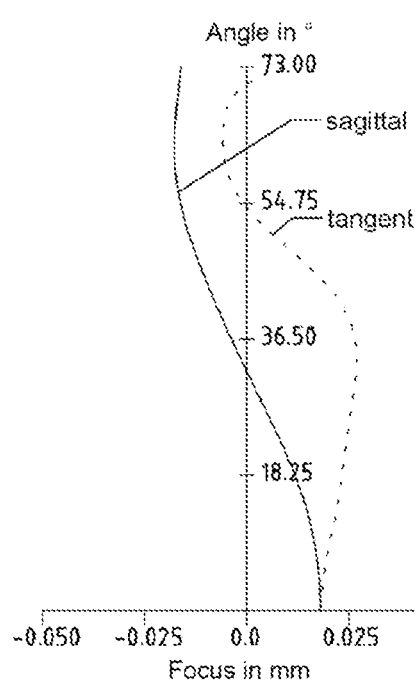
FIG. 7 shows the astigmatism of the second exemplary embodiment.
Figure 8:
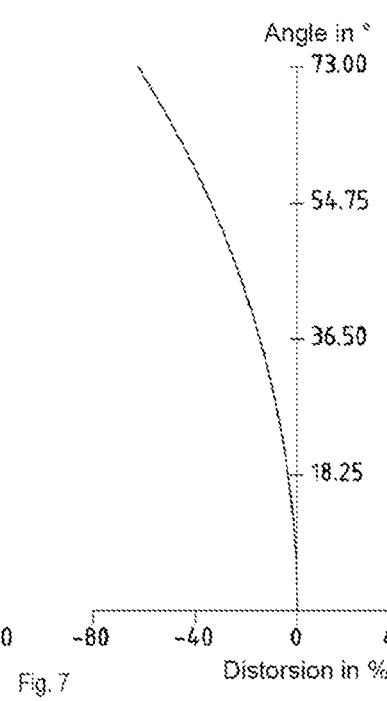
FIG. 8 shows the f-tan theta distortion of the second exemplary embodiment.
Figure 9:
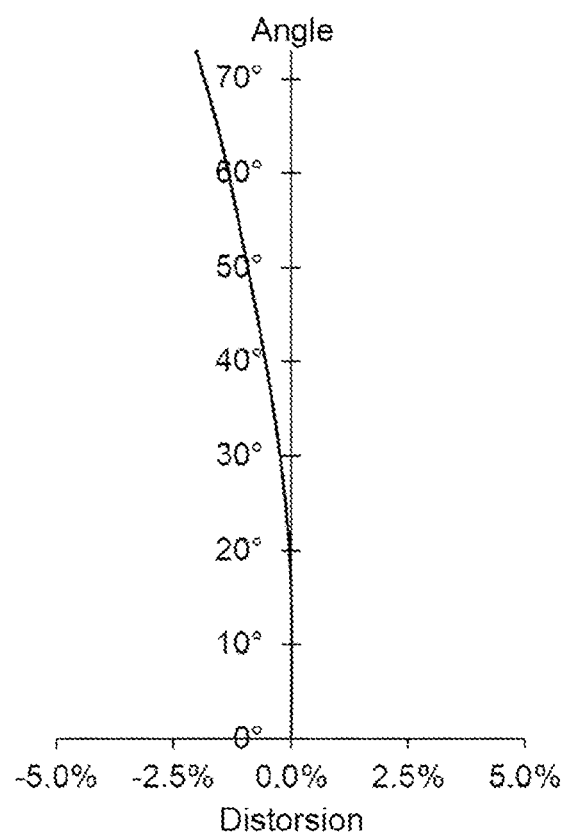
FIG. 9 shows the f-theta distortion of the second exemplary embodiment.

FIG. 7 shows the astigmatism of the second exemplary embodiment. FIG. 8 shows the f-tan theta distortion of the second exemplary embodiment. A high level of distortion toward the edge of the image is intended in this case. FIG. 9 shows the f-theta distortion of the second exemplary embodiment.

Figure 10:
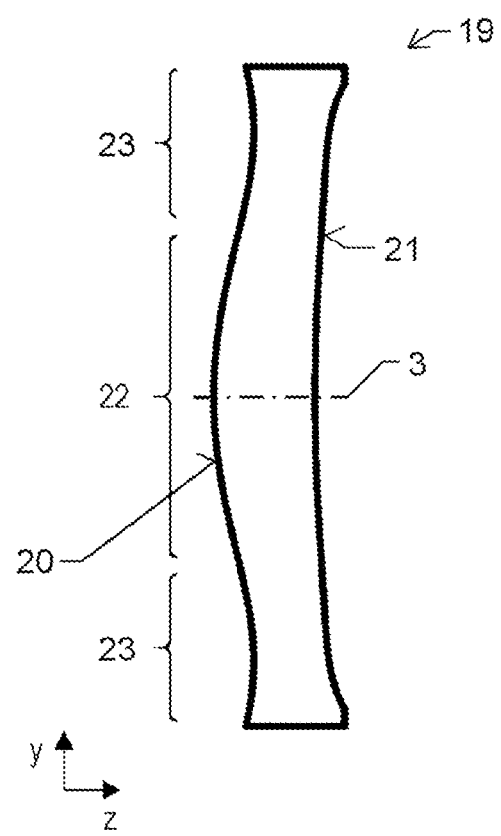
FIG. 10 shows a plastic bi-aspheric lens element according to the invention.

FIG. 10 shows a plastic bi-aspheric lens element according to the invention. A light entry surface 20 of the plastic bi-aspheric lens element 19 is equipped with a near-axis convex region 22 and a peripheral concave area 23. The light exit surface 21 of the plastic lens element is concave and without points of inflection. The optical axis 3 runs in the z-direction. This lens element shown here is used as the fifth lens element 19 of the first exemplary embodiment and is designed with the parameters given in table 1, table 2, and table 3.

Figure 11:
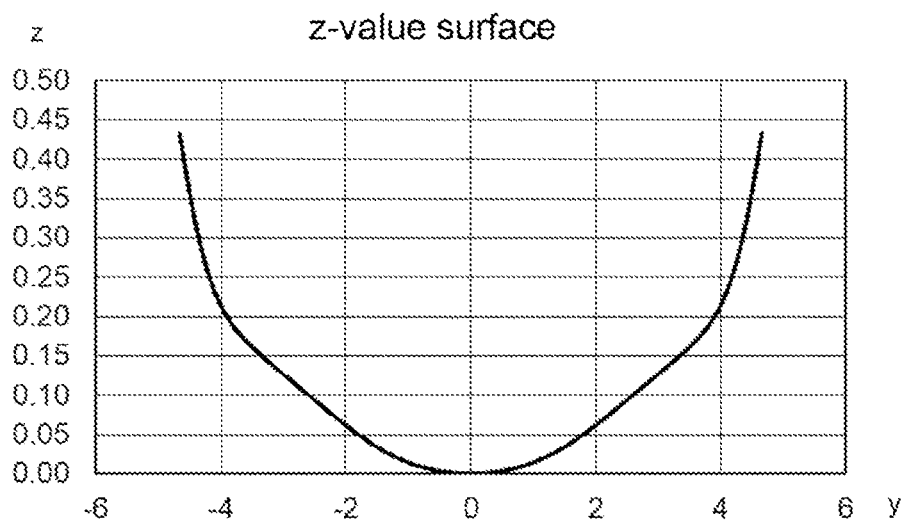
FIG. 11 shows the light exit surface of the plastic bi-aspheric lens element.

FIG. 11 shows the light exit surface of the plastic bi-aspheric lens element. The light exit surface of the lens element shown in FIG. 10, the right-hand lens element surface 21 in the illustration in FIG. 10, is shown as a function z(y). The z and y values are each given in mm. The value y=0 corresponds to the optical axis. The function is shown in a sectional plane x=0, which runs through the optical axis.

Figure 12:
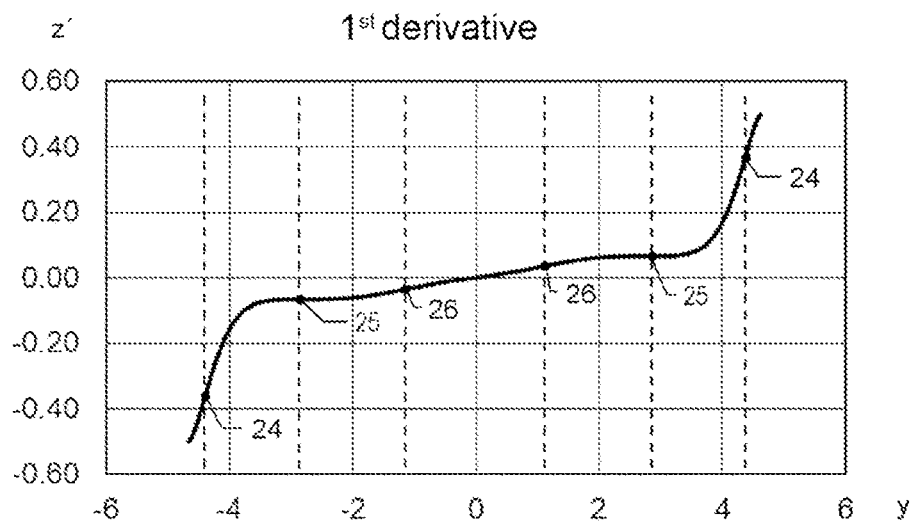
FIG. 12 shows the first derivative of the light exit surface.

FIG. 12 shows the first derivative of the light exit surface. The first derivative z'(y)=dz(y)/dy of the function z(y) shown in FIG. 11 is shown. y is also specified in mm here. The first derivative has a first point of inflection 24, a second point of inflection 25, and a third point of inflection 26. These points of inflection are each visible twice in the illustration because the derivative is shown from the negative to the positive edge of the lens element. If only the range y≥0 is considered, then each point of inflection is present only once. This corresponds to the statement that there are three points of inflection between the optical axis at y=0 and the edge of the lens element, here at y=4.6 mm.

Figure 13:
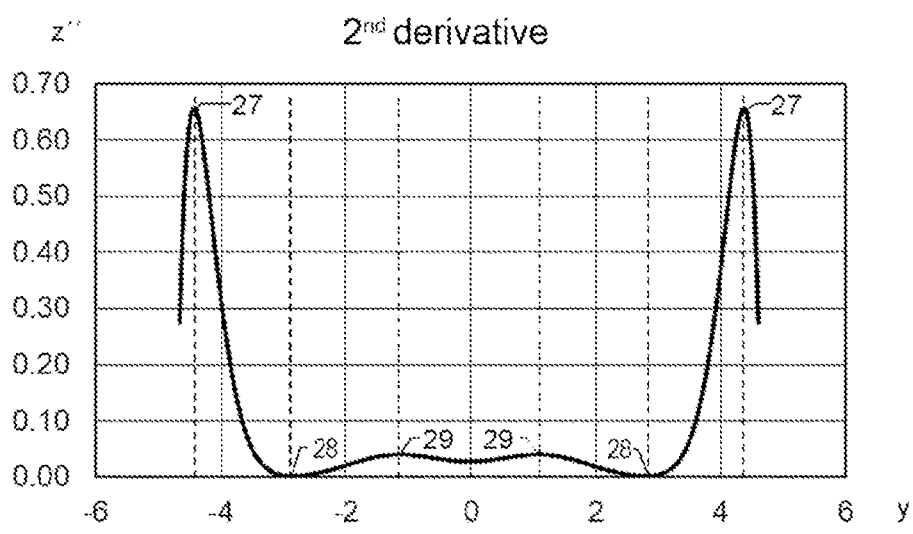
FIG. 13 shows the second derivative of the light exit surface.

FIG. 13 shows the second derivative of the light exit surface. The curvature is shown as z"(y)=$d^2$z(y)/$dy^2$ of the function z(y) shown in FIG. 11. The coordinate y is likewise specified in mm here, z" in 1/mm.

In this example, there is a local maximum as the first extremal value 27 of the curvature, and it is also the global maximum. This local maximum is arranged at a distance from the edge of the light exit surface. There is lower curvature at the lens element edge in comparison with this global maximum.

Figure 14:
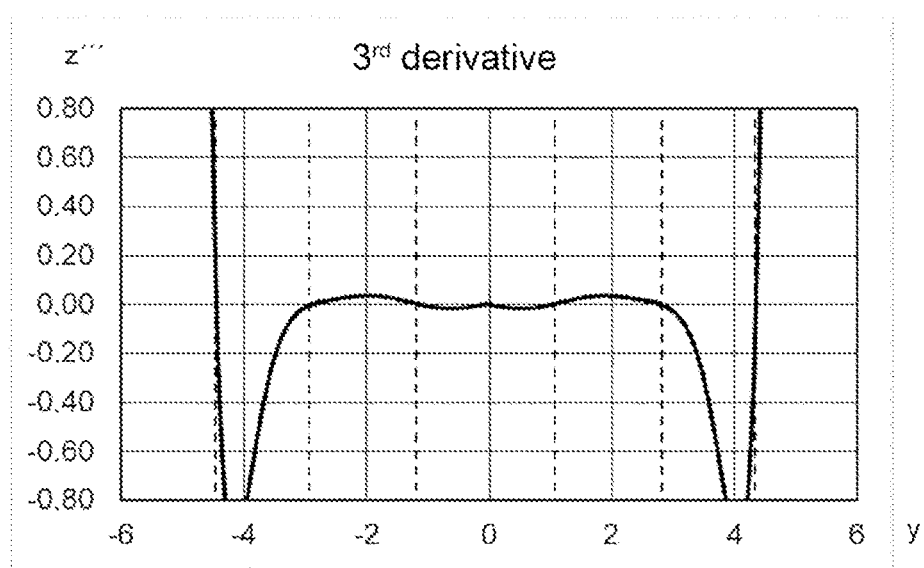
FIG. 14 shows the third derivative of the light exit surface.

A local minimum as a second extremal value 28 is present between the global maximum 27 of the curvature and the closest local maximum as a third extremal value 29. The second maximum 29 is arranged at a distance from the optical axis. As a result, three points of inflection of the first derivative dz(y)/dy are present between the optical axis and the edge. The curvature is non-negative, that is to say ≥0, everywhere. A further local minimum of the curvature can be seen on the optical axis, that is to say at the point y=0, with there being no point of inflection of the first derivative z' at this point. FIG. 14 shows the third derivative of the light exit surface. The third derivative z'''(y) of the function shown in FIG. 11 has a respective zero crossing at each point of inflection of the first derivative z' shown in FIG. 12, this being a sufficient criterion for the presence of the aforementioned points of inflection 24, 25, and 26 of the first derivative.

FIG. 15, FIG. 16, and FIG. 17 show another plastic bi-aspheric lens element suitable for the use according to the invention. This lens element shown here is used as the fifth lens element of the second exemplary embodiment and is designed with the parameters given in table 4, table 5, and table 6. FIG. 15 shows the light exit surface. FIG. 16 shows the first derivative of the light exit surface. In this case, there are two points of inflection 24, 25 between the optical axis and the lens element edge. FIG. 17 shows the second derivative of the light exit surface. A global maximum 27 of the curvature is provided at the edge of the light exit surface and a local maximum 29 of the curvature is at a distance from the edge. A local minimum 28 of the curvature is arranged between the local maximum and the global maximum situated at the edge.

Figure 18:
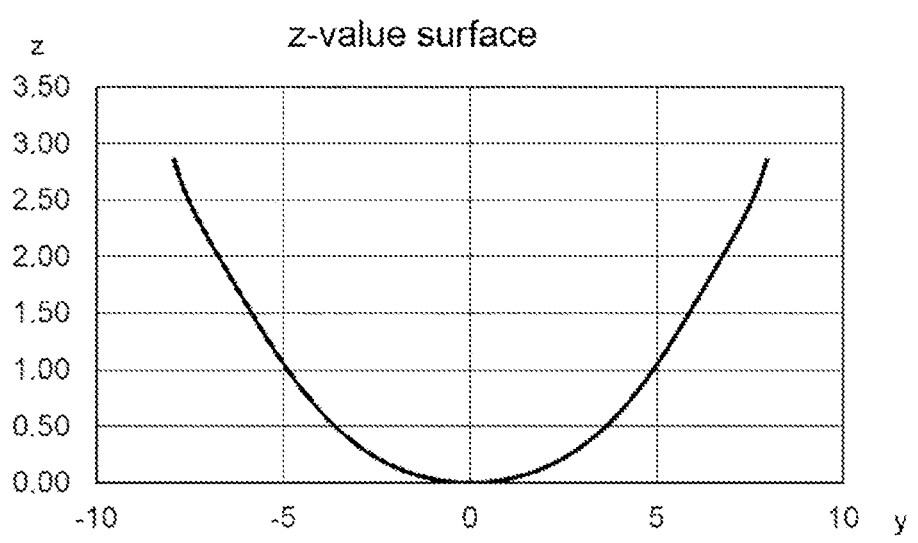
FIG. 18 shows the light exit surface of a further plastic lens element.
Figure 19:
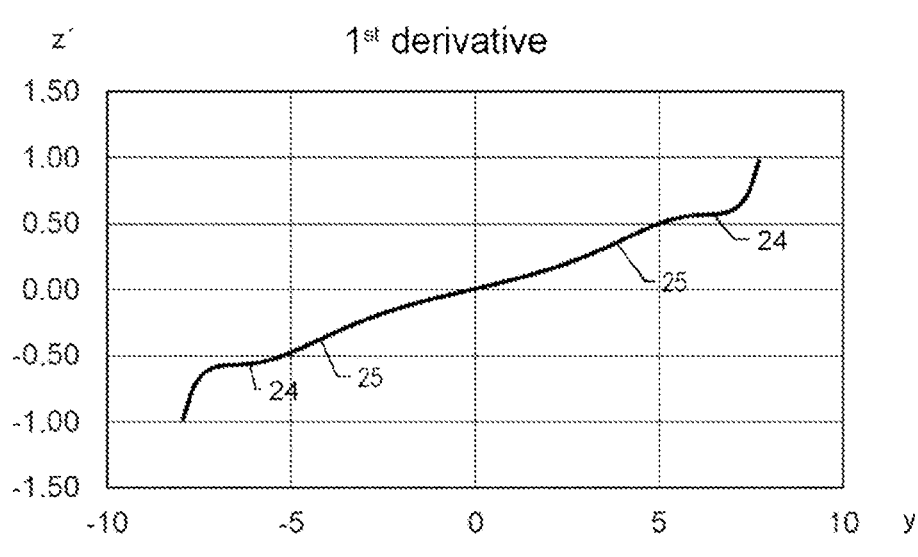
FIG. 19 shows the first derivative of the light exit surface.
Figure 20:
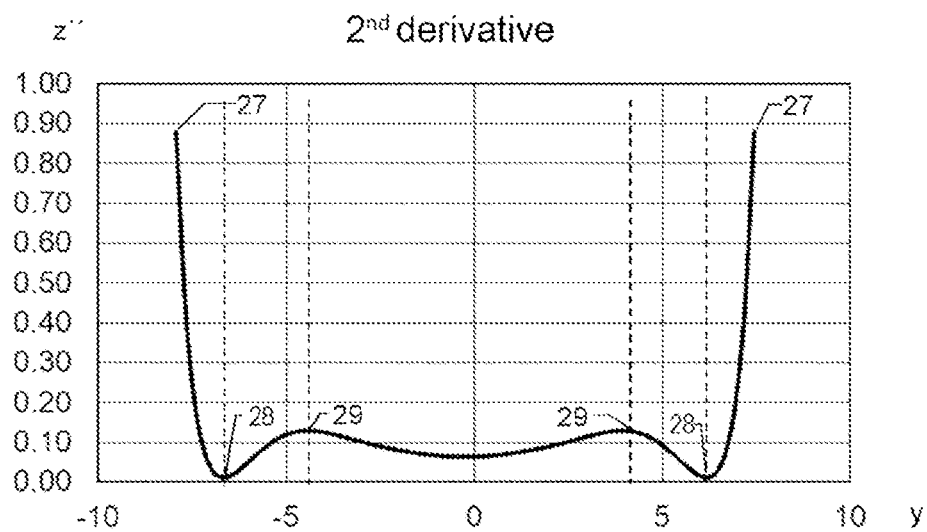
FIG. 20 shows the second derivative of the light exit surface.

FIG. 18, FIG. 19, and FIG. 20 show another plastic bi-aspheric lens element suitable for the use according to the invention. This lens element shown here is used to correct the field curvature in the third exemplary embodiment and is designed with the parameters given as surface 10 in line no. 10 of table 7, table 8, and table 9. In this case, there are two points of inflection 24, 25 of the first derivative z' between the optical axis and the lens element edge.

Figure 21:
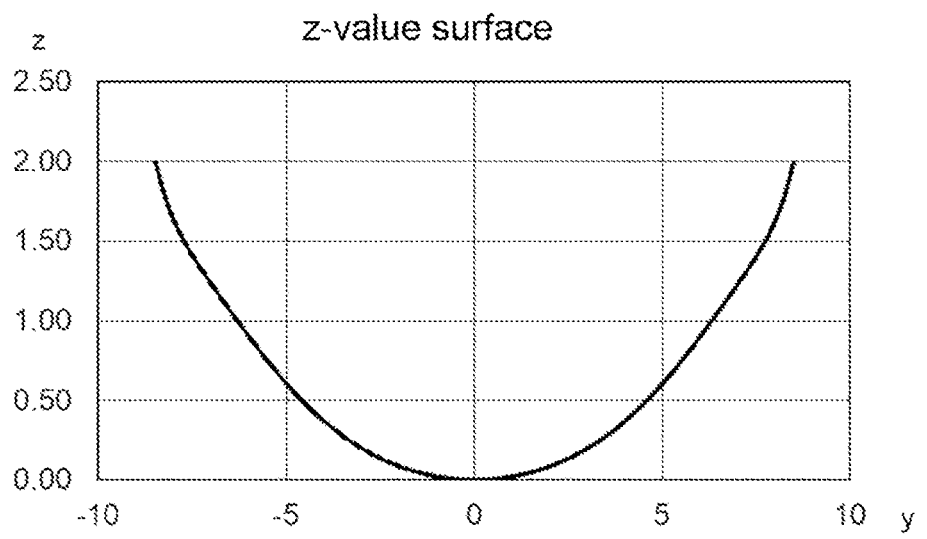
FIG. 21 shows the light exit surface of a further plastic lens element.
Figure 22:
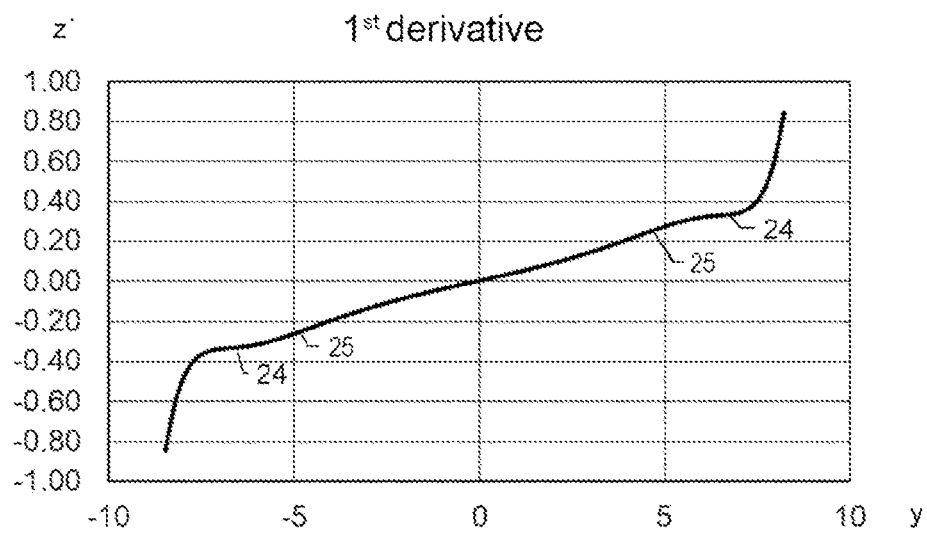
FIG. 22 shows the first derivative of the light exit surface.
Figure 23:
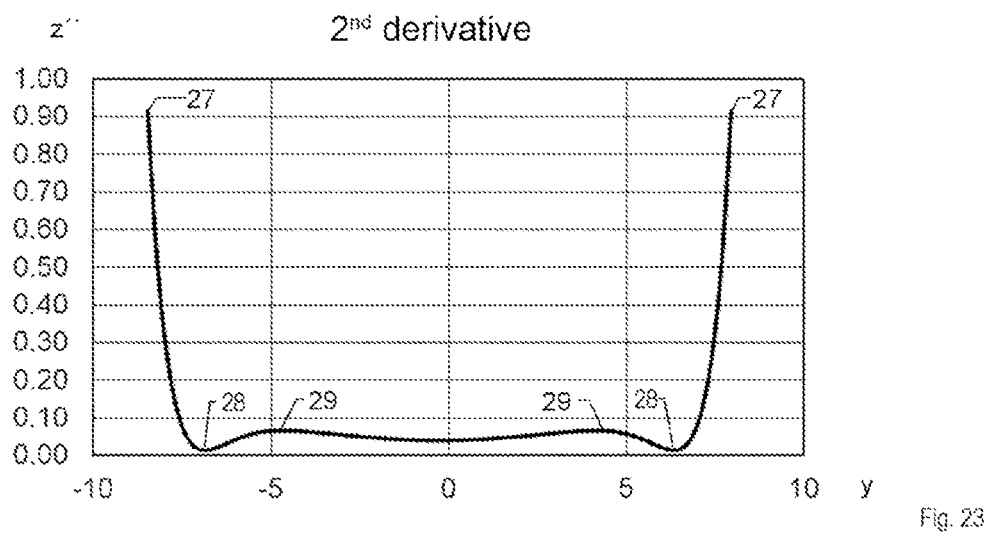
FIG. 23 shows the second derivative of the light exit surface.

FIG. 21, FIG. 22, and FIG. 23 show another plastic bi-aspheric lens element suitable for the use according to the invention. This lens element shown here is used to correct the field curvature in the third exemplary embodiment and is designed with the parameters given as surface 10 in line no. 10 of table 10, table 11, and table 12. In this case, there are two points of inflection 24, 25 of the first derivative z' between the optical axis and the lens element edge.

Figure 24:
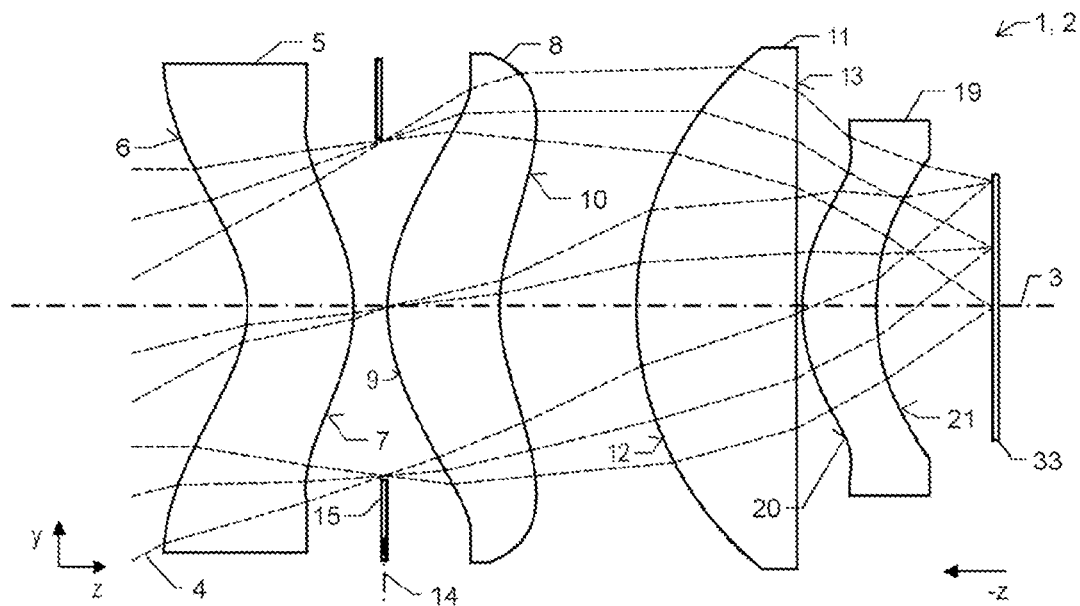
FIG. 24 shows a third exemplary embodiment.

FIG. 24 shows a third exemplary embodiment. Shown is the use of the further plastic bi-aspheric lens element 19 from FIG. 18, FIG. 19, and FIG. 20 for correcting the field curvature of an imaging lens with four lens elements. The lens elements are indicated in the figure as first lens element 5, second lens element 8, third lens element 11, and corrective lens element 19 with the light entry surface 20 and the light exit surface 21 of the corrective lens element. Corresponding to the explanations given under the first exemplary embodiment, the optical design of this third exemplary embodiment is implemented according to table 7 below:

TABLE 7

| No. | Type | Comment | Radius of curvature KR in mm | Thickness/ distance in mm | Material | Radius in mm |
|---|---|---|---|---|---|---|
| 1 | Standard | Object | ∞ | ∞ | Air | |
| 2 | Asphere | Surface 1 | −6.230944 | 5.701835 | Polymer 1 (n = 1.5300) | 12.416714 |
| 3 | Asphere | Surface 2 | −8.896737 | 1.577207 | Air | 10.200998 |
| 4 | Standard | Diaphragm | ∞ | 0.100000 | Air | 8.835525 |
| 5 | Asphere | Surface 3 | 9.246630 | 5.998586 | Polymer 2 (n = 1.5300) | 11.594786 |
| 6 | Asphere | Surface 4 | 9.519479 | 7.127095 | Air | 12.406077 |
| 7 | Standard | Surface 5 | 18.050311 | 8.511258 | Glass 1 (n = 1.8467) | 12.744462 |
| 8 | Standard | Surface 6 | ∞ | 0.234272 | Air | 11.478141 |
| 9 | Asphere | Surface 9 | 9.856429 | 3.999862 | Polymer 3 (n = 1.5300) | 9.088801 |
| 10 | Asphere | Surface 10 | 15.549429 | 6.050000 | Air | 7.605896 |
| 11 | Standard | Image | ∞ | 0.000000 | | 7.500000 |

The coefficients of the aspherical surfaces (surfaces of the asphere type with the index in column 1 specified in table 7 above) given in the following tables, table 8 and table 9, were used:

TABLE 8

| No. | k | $C_2$ in mm−1 | $C_4$ in mm−3 | $C_6$ in mm−5 | $C_8$ in mm−7 |
|---|---|---|---|---|---|
| 2 | −2.560057 | 0 | 5.3091E−05 | 1.9890E−06 | −3.0424E−08 |
| 3 | −0.969566 | 0 | 2.7298E−04 | 3.4469E−06 | −1.2549E−07 |
| 5 | −1.104189 | 0 | −2.6562E−04 | 3.4788E−06 | −4.9384E−08 |
| 6 | −4.302363 | 0 | −3.0131E−04 | 5.9167E−06 | −1.1209E−07 |
| 9 | −1.608437 | 0 | 1.2814E−04 | 5.7453E−06 | −4.7252E−07 |
| 10 | −6.018323 | 0 | 6.8157E−04 | −1.3795E−05 | 8.8297E−07 |

TABLE 9

| No. | $C_{10}$ in mm-9 | $C_{12}$ in mm-11 | $C_{14}$ in mm-13 | $C_{16}$ in mm-15 |
|---|---|---|---|---|
| 2 | 2.4762E−10 | −1.2391E−12 | 3.6987E−15 | −5.1645E−18 |
| 3 | 2.5971E−09 | −3.1175E−11 | 1.9796E−13 | −5.0661E−16 |
| 5 | 4.8536E−10 | −2.7529E−12 | 6.7391E−15 | −4.4890E−18 |
| 6 | 1.3620E−09 | −9.9515E−12 | 3.8787E−14 | −6.2599E−17 |
| 9 | 1.5230E−08 | −3.0286E−10 | 2.9497E−12 | −1.0681E−14 |
| 10 | −3.8027E−08 | 7.6878E−10 | −7.8042E−12 | 3.4208E−14 |

Unspecified aspherical surface coefficients, here all with an odd index, are to be assumed to be zero.

The focal length of the first lens element is $f_1 = -149.85$ mm, that of the second lens element is $f_2 = 17.67$ mm. The focal length of the third lens element is $f_3 = 22.08$ mm, that of the corrective lens element is $f_5 = 41.43$ mm. The lens has a focal length F of 13.01 mm.

In a modification of this exemplary embodiment, the lens is focused at a finite object distance. This can be implemented by changing the image distance. To this end, the distance in line No. 10 can be increased accordingly.

In a further modification, not shown, the lens can be used as a projection lens. To this end, a light source is arranged in plane 33 instead of the sensor. Then a scene located in front of the lens in the negative z-direction can be illuminated.

The design wavelength of this exemplary embodiment is 905 nm. Modifications of the exemplary embodiments can also be used at other wavelengths listed in the description.

Figure 25:
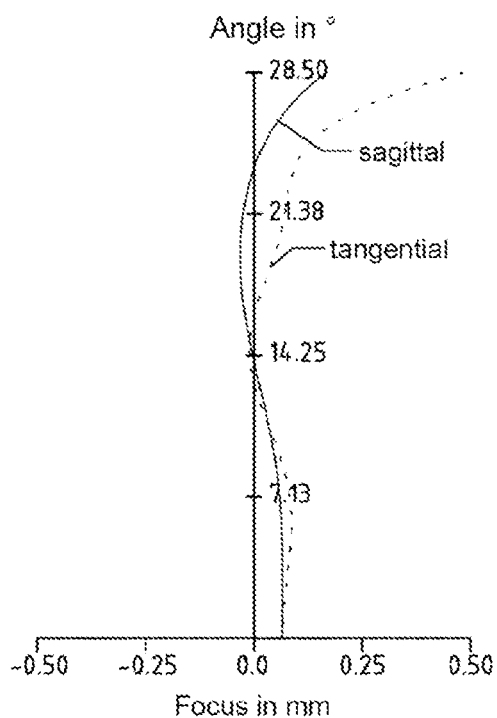
FIG. 25 shows the astigmatism of the third exemplary embodiment.
Figure 26:
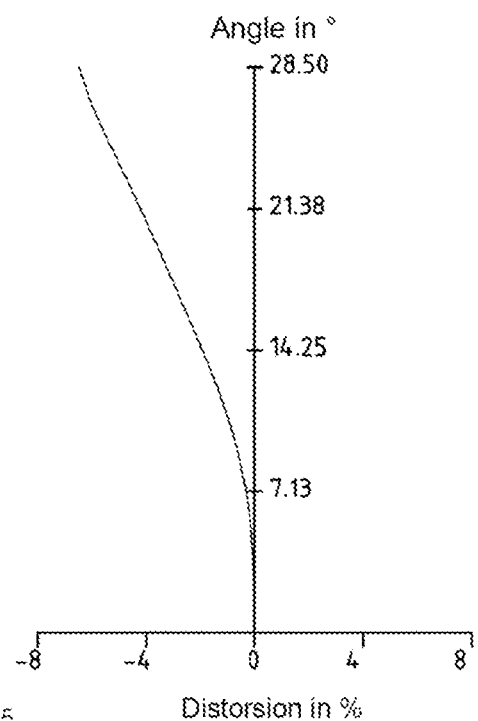
FIG. 26 shows the f-tan theta distortion of the third exemplary embodiment.
Figure 27:
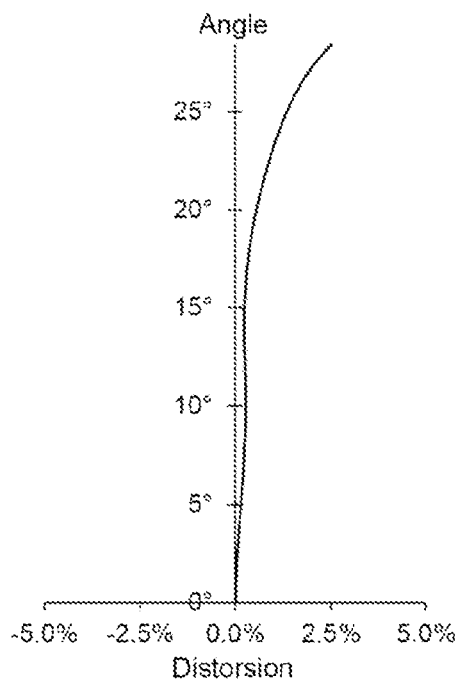
FIG. 27 shows the f-theta distortion of the third exemplary embodiment.
Figure 31:
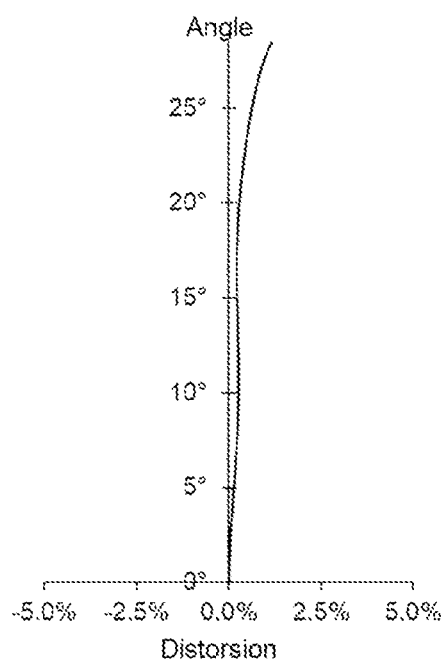
FIG. 31 shows the f-theta distortion of the fourth exemplary embodiment.

FIG. 25 shows the astigmatism of the third exemplary embodiment. FIG. 26 shows the f-tan theta distortion of the third exemplary embodiment. FIG. 27 shows the f-theta distortion of the third exemplary embodiment.

FIG. 28 shows a fourth exemplary embodiment. The use of a further plastic bi-aspheric lens element from FIG. 21, FIG. 22, and FIG. 23 is shown. The lens elements are indicated in the figure as first lens element 5, second lens element 8, third lens element 11, and corrective lens element 19 with the light entry surface 20 and the light exit surface 21 of the corrective lens element. Corresponding to the explanations given under the first exemplary embodiment, the optical design of this fourth exemplary embodiment is implemented according to table 10 below:

TABLE 10

| No. | Type | Comment | Radius of curvature KR in mm | Thickness/ distance in mm | Material | Radius in mm |
|---|---|---|---|---|---|---|
| 1 | Standard | Object | ∞ | ∞ | Air | |
| 2 | Asphere | Surface 1 | −6.188174 | 6.000000 | Polymer 1 (n = 1.5300) | 12.782538 |
| 3 | Asphere | Surface 2 | −8.350660 | 0.663085 | Air | 10.534452 |
| 4 | Standard | Diaphragm | ∞ | 0.100000 | Air | 8.770000 |
| 5 | Asphere | Surface 3 | 9.327281 | 6.000000 | Polymer 2 (n = 1.5300) | 11.954788 |
| 6 | Asphere | Surface 4 | 10.451651 | 6.213997 | Air | 12.610611 |
| 7 | Standard | Surface 5 | 97.655164 | 7.000000 | Glass 1 (n = 1.8467) | 13.059946 |
| 8 | Standard | Surface 6 | −33.034230 | 0.100000 | Air | 12.981984 |
| 9 | Asphere | Surface 9 | 10.465107 | 6.000000 | Polymer 3 (n = 1.5300) | 10.250292 |
| 10 | Asphere | Surface 10 | 24.825405 | 5.643037 | Air | 8.490759 |
| 11 | Standard | Image | ∞ | 0.000000 | | 8.000000 |

The coefficients of the aspherical surfaces (surfaces of the asphere type with the index in column 1 specified in table 7 above) given in table 11 and table 12 below, were used:

TABLE 11

| No. | k | $C_2$ in mm-1 | $C_4$ in mm-3 | $C_6$ in mm-5 | $C_8$ in mm-7 |
|---|---|---|---|---|---|
| 2 | −2.753519 | 0 | 3.2627E−05 | 1.4596E−06 | −1.3738E−08 |
| 3 | −1.279765 | 0 | 3.1220E−04 | −1.0671E−06 | 1.1099E−08 |
| 5 | −1.242730 | 0 | −1.9211E−04 | 1.5774E−06 | −1.3278E−08 |
| 6 | −8.448702 | 0 | −1.5813E−04 | 4.9644E−07 | 1.9398E−09 |
| 9 | −8.196975 | 0 | 7.5321E−04 | −1.7029E−05 | 2.9885E−07 |
| 10 | −20.000000 | 0 | 3.7068E−04 | −6.5538E−06 | 1.8875E−07 |

TABLE 12

| No. | $C_{10}$ in mm-9 | $C_{12}$ in mm-11 | $C_{14}$ in mm-13 | $C_{16}$ in mm-15 |
|---|---|---|---|---|
| 2 | 5.7568E−11 | −9.5057E−14 | 0.0000E00 | 0.0000E00 |
| 3 | −7.0163E−11 | 2.9540E−13 | 0.0000E00 | 0.0000E00 |
| 5 | 7.5324E−11 | −2.7316E−13 | 0.0000E00 | 0.0000E00 |
| 6 | −5.6079E−11 | 3.3197E−13 | −9.2673E−16 | 0.0000E00 |
| 9 | −3.3110E−09 | 1.3902E−11 | 0.0000E00 | 0.0000E00 |
| 10 | −4.2876E−09 | 3.3680E−11 | 0.0000E00 | 0.0000E00 |

Unspecified aspherical surface coefficients, here all with an odd index, are to be assumed to be zero.

The focal length of the first lens element is $f_1 = -966.18$ mm, that of the second lens element is $f_2 = 17.84$ mm. The focal length of the third lens element is $f_3 = 30.94$ mm, that of the corrective lens element is $f_5 = 30.26$ mm. The lens has a focal length F of 12.64 mm.

In a modification of this exemplary embodiment, the lens is focused at a finite object distance. This can be implemented by changing the image distance. To this end, the distance in line No. 10 can be increased accordingly.

In a further modification, not shown, the lens can be used as a projection lens. To this end, a light source is arranged in plane 33 instead of the sensor. Then a scene located in front of the lens in the negative z-direction can be illuminated.

The design wavelength of this exemplary embodiment is 905 nm. Modifications of the exemplary embodiments can also be used at other wavelengths listed in the description.

FIG. 29 shows the astigmatism of the fourth exemplary embodiment. FIG. 30 shows the f-tan theta distortion of the fourth exemplary embodiment. FIG. 30 shows the f-tan theta distortion of the fourth exemplary embodiment.

Figure 32:
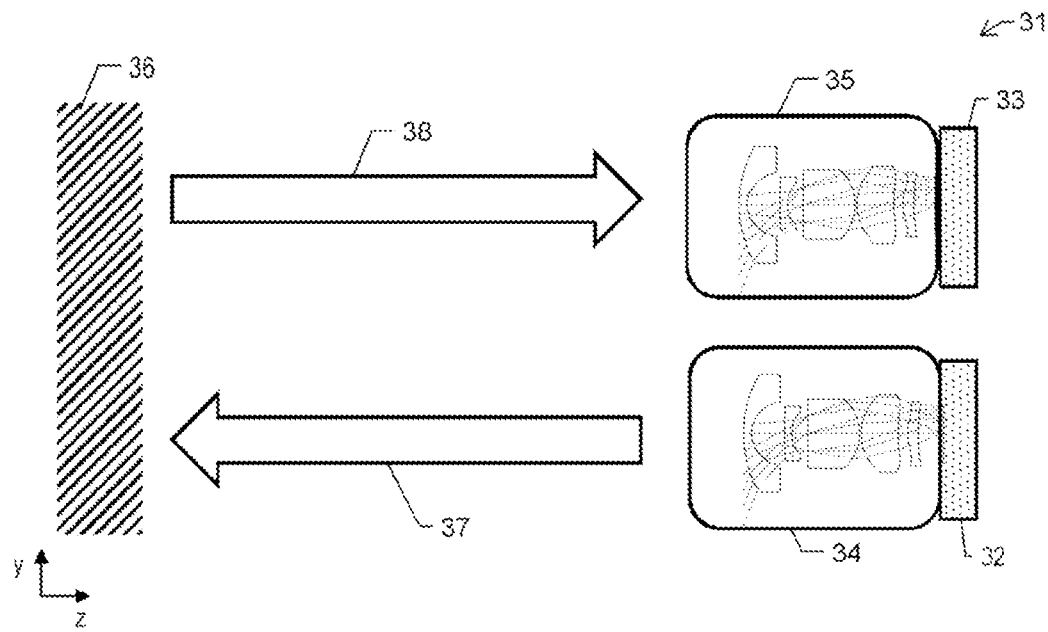
FIG. 32 shows a measurement system according to the invention.

FIG. 32 shows a measurement system according to the invention. The measurement system 31 comprises a transmitter lens 34, a receiver lens 35, a light source 32, and a matrix sensor 33. The light source illuminates one or more objects 36 with a transmitter light 37. The matrix sensor detects the time-of-flight of the reflected light 38.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A lens with a fixed focal length F and a field of view of more than 45° with respect to the optical axis, with at least a first surface, a second surface, a third surface, a fourth surface, a fifth surface, a sixth surface, a seventh surface, an eighth surface, a ninth surface, and a tenth surface being successively arranged in the beam path, wherein the first surface and the second surface belong to a first lens element with a first focal length $f_1$, the third surface and the fourth surface belong to a second lens element with a second focal length $f_2$, the fifth surface and the sixth surface belong to a third lens element with a third focal length $f_3$ and a refractive index of greater than 1.7, the seventh surface and the eighth surface belong to a fourth lens element with a fourth focal length $f_4$, the ninth surface and the tenth surface belong to a fifth lens element with a fifth focal length $f_5$, the first lens element is formed as a meniscus with a negative refractive power $D_1 = 1/f_1 < 0$, a diaphragm is arranged between the second lens element and the third lens element, the third lens element has a positive refractive power $D_3 = 1/f_3 > 0$, the sum $D_3 + D_4 + D_5$ of the refractive power $D_3 = 1/f_3$ of the third lens element and the refractive power $D_4 = 1/f_4$ of the fourth lens element and the refractive power $D_5 = 1/f_5$ of the fifth lens element is positive, the ninth surface is formed to be aspherical and has a near-axis convex region and a peripheral concave region, at least one of the seventh surface, eighth surface, and tenth surface is formed to be aspherical, and where $$\left| \frac{1}{f_2} + \frac{1}{f_4} + \frac{1}{f_5} \right| \leq \frac{0.15}{F}$$

applies.

2. The lens as claimed in claim 1, wherein
the first lens element consists of a first glass, and/or
the second lens element consists of a first plastic, and/or
the third lens element consists of a second glass, and/or
the fourth lens element consists of a second plastic, and/or
the fifth lens element consists of a third plastic.

3. The lens as claimed in claim 1, wherein the fifth lens element consists of a plastic and the Abbe number of the third lens element is less than 35 and the Abbe numbers of the second, fourth, and fifth lens elements are all either between 50 and 65 or between 18 and 32.

4. The lens as claimed in claim 1, wherein the first lens element and/or the second lens element have at least one aspherical surface and/or in that the seventh surface, eighth surface, ninth surface, and tenth surface are all formed to be aspherical.

5. The lens as claimed in claim 1, wherein at least one of the eighth surface and tenth surface and/or
at least three of the third surface, seventh surface, eighth surface, and tenth surface each have at least one point of inflection.

6. The lens as claimed in claim 1, wherein the tenth surface is formed to be concave and without convex regions and/or in that a first derivative dz/dy of the z-coordinate of the tenth surface with respect to a y-direction in a plane x=0 has at least one point of inflection.

7. The lens as claimed in claim 1, wherein the fifth surface is formed as a flat surface and/or a diaphragm is arranged on the fifth surface.

8. The lens as claimed in claim 1, wherein it has a focal length F of between 2 mm and 5 mm
and/or in that the focal length $f_1$ of the first lens element is between 0.7-times and 1.3-times the focal length $f_2$ of the second lens element
and/or in that the sum of the center thicknesses of the glass lens elements is greater than the sum of the center thicknesses of the plastic lens elements
and/or in that the lens has an overall length and an image circle diameter, the overall length being between two-times and five-times the image circle diameter.

9. The lens as claimed in claim 1, wherein it is formed to be approximately telecentric on the image side, the image-side telecentricity error being less than 10°.

10. The lens as claimed in claim 1, wherein the lens has a lens speed of at least 1:1.3.

11. A measurement system, comprising at least one lens as claimed in claim 1, at least one light source, and at least one matrix sensor, wherein the light source is a laser beam source or an LED and in that the light source is operated in a pulsed manner and in that the pulse length is between 1 ns and 1 ms.

12. The measurement system as claimed in claim 11, wherein the matrix sensor is a SPAD array and/or in that the light source is a VCSEL array or an LED array.

13. The use of a plastic bi-aspheric lens element for correcting field curvature and/or astigmatism and/or distortion as a constitutent part of a lens as claimed in claim 1, wherein the plastic bi-aspheric lens element has a light entry surface with a near-axis convex region and a peripheral concave region and a light exit surface of the plastic lens element is formed to be concave and without points of inflection, and a first derivative dz/dy of the z coordinate of the light exit surface with respect to a y-direction in a plane x=0 has at least one point of inflection between the optical axis and the edge of the light exit surface.

* * * * *